United States Patent
Fujiyama et al.

(10) Patent No.: US 8,250,027 B2
(45) Date of Patent: Aug. 21, 2012

(54) COMPUTER SYSTEM, DATABASE ACCESS METHOD, APPLICATION SERVER, AND PROGRAM

(75) Inventors: Kenichiro Fujiyama, Tokyo (JP); Nobutatsu Nakamura, Tokyo (JP)

(73) Assignee: NEC Corporation, Tokyo (JP)

( * ) Notice: Subject to any disclaimer, the term of this patent is extended or adjusted under 35 U.S.C. 154(b) by 525 days.

(21) Appl. No.: 12/447,529

(22) PCT Filed: Oct. 30, 2007

(86) PCT No.: PCT/JP2007/001184
§ 371 (c)(1),
(2), (4) Date: Apr. 28, 2009

(87) PCT Pub. No.: WO2008/056438
PCT Pub. Date: May 15, 2008

(65) Prior Publication Data
US 2009/0307230 A1    Dec. 10, 2009

(30) Foreign Application Priority Data
Nov. 6, 2006   (JP) ................. 2006-300199

(51) Int. Cl.
G06F 7/00    (2006.01)
G06F 17/30   (2006.01)
(52) U.S. Cl. ........................... 707/602; 707/809
(58) Field of Classification Search .......... 707/602, 707/809
See application file for complete search history.

(56) References Cited

U.S. PATENT DOCUMENTS

| | | | |
|---|---|---|---|
| 2002/0184401 A1* | 12/2002 | Kadel et al. | 709/315 |
| 2003/0078916 A1* | 4/2003 | DeForeest et al. | 707/3 |
| 2003/0126136 A1* | 7/2003 | Omoigui | 707/10 |
| 2005/0080803 A1* | 4/2005 | Sauermann | 707/101 |
| 2006/0053112 A1* | 3/2006 | Chitkara et al. | 707/9 |

FOREIGN PATENT DOCUMENTS

| | | |
|---|---|---|
| JP | 1993334363 A | 12/1993 |
| JP | 1999154158 A | 6/1999 |
| JP | 2000181697 A | 6/2000 |
| JP | 2000259486 A | 9/2000 |
| JP | 2000347910 A | 12/2000 |
| JP | 2002351710 A | 12/2002 |
| JP | 2006004099 A | 1/2006 |

OTHER PUBLICATIONS

International Search Report for PCT/JP2007/001184 mailed Dec. 4, 2007.

* cited by examiner

*Primary Examiner* — John E Breene
*Assistant Examiner* — Joshua Bullock

(57) ABSTRACT

In a computer system, an SQL as a content of data processing request by a database independent protocol (protocol connected to a DBMS) that is issued by an application 3110 is converted from an SQL for an old DB before a migration to an SQL for a new DBMS 3200, then converted into a protocol that depends on a new DBMS 3210, and then provided to the new DBMS 3210. This operation is realized by an extension DB connection middleware 3120 that is obtained by extending a DB connection middleware that does not depend on the DBMS or an application.

24 Claims, 23 Drawing Sheets

COMPUTER SYSTEM, DATABASE ACCESS METHOD, APPLICATION SERVER, AND PROGRAM

This application is the National Phase of PCT/JP2007/001184, filed Oct. 30, 2007, which is based upon and claims the benefit of priority from the Japanese patent application No. 2006-300199, filed on Nov. 6, 2006, the disclosure of which is incorporated herein in its entirety by reference.

TECHNICAL FIELD

The present invention relates to a technology for migrating a system from a currently used old database management system (DBMS) to another new DBMS, in a computer system on which an application that performs information processing together with a DBMS runs.

BACKGROUND ART

In a computer system on which an application that performs information processing together with a DBMS runs, for the purpose of improving performance or the like of the system, the DBMS is migrated from an old DBMS to a new DBMS in some cases. Hereinafter, this kind of migration method will be described with reference to the accompanying drawings.

An old system 1100 that is shown on the left half of FIG. 22 shows an example of the configuration of a computer system that uses an old DBMS 1121, and includes an old application server 1110 and an old database server 1120.

The old application server 1110 includes an application 1111 that performs information processing and a DB connection middleware 1112 that connects the application 1111 to the DBMS 1121.

The DB connection middleware 1112 includes an interface 1113 as an interface of a protocol that does not depend on a database (hereinafter, also referred to as database independent protocol or standard protocol), and an old DB protocol converting unit 1114 that converts the standard protocol into a unique protocol for the old DBMS 1121 (hereinafter, also referred to as database dependent protocol).

The old database server 1120 includes a storage that accumulates old format data 1122 necessary when the application 1111 performs processing, and an old DBMS 1121 that manages the old format data 1122.

The computer system that has the above-described configuration operates as follows.

The application 1111 is connected to the old DBMS 1121 through the DB connection middleware 1112 as necessary and issues data processing request.

The old DBMS 1121 performs data processing using the managed old format data 1122 in accordance with the data processing request to produce a result as a data processing result, and returns the data processing result to the application 1111 through the DB connection middleware 1112.

The application 1111 performs information processing using the data processing result of the old DBMS 1121.

It is assumed in the following description, in the above-described old system 1100, the old DBMS 1121 having been used so far is migrated to the new DBMS 1221 that has a data management format and a protocol different from those of the old DBMS 1121, and the old system 1100 is thus migrated to a new system 1200.

The new system 1200 shows an example of the configuration of a computer system that uses the new DBMS 1221, and includes a new application server 1210 and a new database server 1220.

The new application server 1210 includes an application 1211 that performs information processing, and a DB connection middleware 1212 that connects the application 1211 to the new DBMS 1221.

The DB connection middleware 1212 includes an interface 1213 as an interface of a protocol that does not depend on a database (hereinafter, also referred to as database independent protocol or standard protocol), and a new DB protocol converting unit 1214 that converts the standard protocol into a unique protocol for the new DBMS 1221 (hereinafter, also referred to as database dependent protocol).

The new database server 1220 includes a storage that accumulates new format data 1222 necessary when the application 1211 performs processing, and a new DBMS 1221 that manages the new format data 1222.

First, since the old DBMS 1121 and the new DBMS 1221 are different from each other in data management format, the old format data 1122 cannot be managed in the new DBMS 1221. For this reason, the old format data 1122 needs to be converted into the new format data 1222 having a format that the new DBMS 1221 can manage. This can be realized by using a data conversion tool that is provided by a database vendor or the like.

Further, since the protocols that are connected to the DBMS are different from each other in the old DBMS 1121 and the new DBMS 1221, the application 1111 that is connected to the old DBMS 1121 cannot be connected to the new DBMS 1221 as it is. This problem can be solved by using the DBMS connection middleware 1212. The DB connection middleware is a middleware that hides a difference of the protocols by virtualizing a unique connection method for each DBMS and enables the application to be connected to the DBMS by the standard protocol. Specifically, the DB connection middleware provides the standard interface to the application, converts the data processing request that the application issues through the standard interface from its protocol into the unique protocol for each DBMS, and issues the data processing request to the DBMS. By replacing a function of converting a protocol into the unique protocol for each DBMS in a library, the DB connection middleware is compatible with various kinds of DBMSs.

As the DB connection middleware, an ODBC (Open Data-Base Connectivity), a JDBC (Java (registered trademark) DataBase Connectivity) and the like are known.

In recent years, an application is not directly connected to the DBMS, but is generally connected to the DBMS though the DB connection middleware. For this reason, the application 1111 can be connected to the new DBMS by only replacing the old DB protocol converting unit 1114 with the new DB protocol converting unit 1214.

However, when a content of the data processing request issued by the application 1111, that is, an SQL (Structured Query Language) or the like that defines a data operation is unique to the old DBMS 1121 even though the application can be connected to the new DBMS 1221 in the protocol, the SQL cannot be interpreted in the new DBMS 1221. Therefore, it is not possible to process the request.

In the SQL, since the standard specification is defined in the basic portion such as ISO SQL92 and the like, the protocol conversion is logically made. If the application can be connected to the DBMS, the data processing can be performed without causing a problem. However, actually, in the SQL, an original specification expansion for each DBMS is much made, and the unique SQL for each DBMS using the original specification is generally used in the actual work in many cases. For this reason, at the time of migration of the database, the SQL for the old DBMS that is issued by the application needs to be converted into an SQL for the new DBMS.

As an example of a technology for converting an SQL, a technology that is disclosed in Patent Document 1 or the like is known. The SQL that is issued by the application is generally subjected to hard coding in a source code of the application. Accordingly, in the technology that is disclosed in Patent Document 1, the source code is scanned and a portion that generates the SQL for the old DBMS is rewritten so as to generate the SQL for the new DBMS.

As another technology for converting an SQL, a technology that is disclosed in Patent Document 2 or the like is known. In the technology that is disclosed in Patent Document 2, when the application is created, an SQL portion that generates the SQL is created separately from a source code that realizes another function. Since the SQL portion is separated, setting can be made so as to easily generate the SQL for the new DBMS without searching the SQL portion in the source code.

As another technology for converting an SQL, a technology that is disclosed in Patent Document 3 or the like is known. Referring to FIG. 23, in the technology that is disclosed in Patent Document 3, a relay device 2200 is provided between a group of application servers 2100-1, 2100-2, ..., and 2100-n, and a new database server 2300 that includes a storage which accumulates new format data 2320 and a new DBMS 2310 which manages the new format data 2320. The relay device 2200 converts the SQL for the old DBMS issued by the application 2110 into the SQL for the new DBMS. According to this technology, it is possible to perform an SQL conversion without changing the application itself.

[Patent Document 1] Japanese Patent Application Laid-Open (JP-A) No. 2000-181697
[Patent Document 2] Japanese Patent Application Laid-Open (JP-A) No. 2000-347910
[Patent Document 3] Japanese Patent Application Laid-Open (JP-A) No. 2000-259466

DISCLOSURE OF THE INVENTION

However, the SQL conversion technologies that are disclosed in Patent Documents have the following problems.

According to the technology that is disclosed in Patent Document 1, it is very difficult to rewrite the source code so as to specify the portion generating the SQL and generate the new SQL without affecting other logic of the application. This is because it is necessary to accurately interpret a large amount of complicated source codes. Further, the technology cannot be applied to the application having only the executable binary code, but not a remaining source code.

According to the technology that is disclosed in Patent Document 2, if the application is developed using the technology, there is no problem. However, the technology cannot be applied to numbers of existing applications that are not developed using the technology.

According to the technology that is disclosed in Patent Document 3, the relay device hooks an access from the application to the DBMS, but the protocol of the access is a unique proprietary protocol for each DBMS. Accordingly, the unique protocol for each DBMS needs to be interpreted to hook and retransmit the access. Since the protocol is generally not opened, the interpretation is very difficult. Since the protocol is the unique protocol for each DBMS even if the protocol can be interpreted, an ad-hoc development is necessary for each DBMS.

Further, the SQL that is to be changed when the DBMS is migrated becomes a portion of the old SQL in many cases, but in the above-described SQL conversion technology, a burden on a user that is necessary in washout work of the old SQL to be converted into the new SQL that becomes the presupposed work of the conversion is large. This is because the user needs to understand the difference between the old SQL and the new SQL and determine a necessity of the conversion of all the old SQL into the new SQL.

Further, in the above-described SQL conversion technologies, there is a common problem that it is not possible to verify whether the converted SQL is correctly operated. The reason is as follow. Even if the new DBMS in which the converted SQL is provided does not cause an explicit error and responds normally, it is not possible to know whether the response is the same response as the old DBMS in an actual operation environment.

Further, since it is difficult to verify the operation of the converted SQL in the actual operation environment, conversion information (conversion rule) that defines how to convert the SQL for the old DBMS into the SQL for the new DBMS cannot be modified in conjunction with the verification, and it is difficult to efficiently modify the conversion information.
(Object of the Present Invention)

A first object of the present invention is to provide a computer system on which an application that performs information processing together with a DBMS runs. In the computer system, when a currently used old DBMS is migrated to another new DBMS, it is possible to continuously operate the computer system transparently without changing the application and versatilely irrespective of the kinds of the new and old DBMSs.

A second object of the present invention is to make it possible to reduce a burden on a user that is necessary in washout work of an old SQL to be converted into a new SQL.

A third object of the present invention is to make it possible to verify whether a converted SQL is correctly operated in an actual operation environment.

A fourth object of the present invention is to modify conversion information used to convert an SQL in conjunction with the verification of the conversion information in an actual operation environment.

According to the present invention, there is provided a first computer system including: one or more application servers on which an application program that issues a database processing request conforming to a first database operation language in accordance with a database independent protocol runs; a database server which receives a database processing request conforming to a second database operation language in accordance with a database dependent protocol; and a database connecting unit which converts the database processing request issued from the application program from its database operation language into the second database operation language and then converts the database processing request from its protocol into the database dependant protocol to provide the database processing request to the database server, and converts the data processing result of the database server from its protocol into the database independent protocol to return the data processing result to the application program.

According to a second computer system of the present invention, in the first computer system, the database connecting unit includes: an operation language converting unit which converts the database processing request issued from the application program from its database operation language into the second database operation language; a protocol converting unit which converts the database processing request having been converted from its database operation language into the second database operation language from its protocol into the database dependent protocol and converts the data processing result of the database server from its protocol into the database independent protocol; and a control unit which performs the entire control of the database connecting unit.

According to the present invention, there is provided a third computer system including: one or more application servers on which an application program that issues a database processing request conforming to a first database operation language in accordance with a database independent protocol runs; an old database server which receives the database processing request conforming to the first database operation language in accordance with a database dependant protocol; a new database server which receives a database processing request conforming to a second database operation language in accordance with the database dependent protocol; and a database connecting unit which multiplexes the database processing requests issued from the application program, converts one database processing request from its protocol into the database dependant protocol suitable for the old database server to provide the database processing request to the old database server, converts the other database processing request from its protocol into the database dependant protocol suitable for the new database server to provide the database processing request to the new database server, converts the data processing results of the old database server and the new database server from their protocol into the database independent protocol and compares and verifies the data processing results to output the comparison and verification result, and returns the data processing result of the old database server converted from its protocol into the database independent protocol to the application program when a first mode is designated, and converts the database processing request issued from the application program from its database operation language into the second database operation language and then converts the database processing request from its protocol into the database dependant protocol suitable for the new database server to provide the database processing request to the new database server, and converts the data processing result of the new database server from its protocol into the database independent protocol to return the data processing result to the application program when a second mode is designated.

According to the present invention, there is provided a fourth computer system including: one or more application servers on which an application program that issues a database processing request conforming to a first database operation language in accordance with a database independent protocol runs; an old database server which receives the database processing request conforming to the first database operation language in accordance with a database dependant protocol; a new database server which receives a database processing request conforming to a second database operation language in accordance with a database dependant protocol; and a database connecting unit which multiplexes the database processing requests issued from the application program, converts one database processing request from its protocol into the database dependant protocol suitable for the old database server to provide the database processing request to the old database server, converts the other database processing request from its database operation language into the second database operation language and converts the database processing request from its protocol into the database dependant protocol suitable for the new database server to provide the database processing request to the new database server, converts the data processing results of the old database server and the new database server from their protocol into the database independent protocol and compares and verifies the data processing results to output the comparison and verification result, and returns the data processing result of the old database server converted from its protocol into the database independent protocol to the application program when a first mode is designated, and converts the database processing request issued from the application program from its database operation language into the second database operation language and converts the database processing request from its protocol into the database dependent protocol suitable for the new database server to provide the database processing request to the new database server, and converts the data processing result of the new database server from its protocol into the database independent protocol to return the data processing result to the application program when a second mode is designated.

According to a fifth computer system of the present invention, in the third or fourth computer system, during processing of the first mode, when the data processing results of the old database server and the new database server are not matched with each other, the database connecting unit stops further provision of database processing request to the new database server.

According to a sixth computer system of the present invention, in the third or fourth computer system, during processing of the first mode, when the data processing results of the old database server and the new database server are not matched with each other, if the original database processing request is a request to change data, the database connecting unit stops further provision of the database processing request to the new database server.

According to a seventh computer system of the present invention, in the third or fourth computer system, during processing of the first mode, when the data processing results of the old database server and the new database server are not matched with each other, if the original database processing request is a request to change data, the database connecting unit cancels the database processing request to the old database server and the new database server, and returns the data processing result indicating that the database processes are not performed to the application program.

According to an eight computer system of the present invention, in the fourth computer system, during processing of the first mode, when the data processing results of the old database server and the new database server are not matched with each other, the database connecting unit cancels the database processing request to the new database server as necessary, changes the conversion information used to convert the first database operation language into the second database operation language and converts the original database processing request from its database operation language into the second database operation language using the conversion information after the change, converts the database processing request from its protocol into the database dependent protocol suitable for the new database server to provide the database processing request to the new database server, and converts the obtained data processing result of the new database server from its protocol into the database independent protocol to compare and verify the data processing result and the data processing result of the old database server.

According to a ninth computer system of the present invention, the eighth computer system further includes: a switching unit which switches the first mode into the second mode by detecting lowering of the probability of the data processing results of the old database server and the new database server being not matched with each other, during the processing of the first mode.

According to a tenth computer system, in the third or fourth computer system, the database connecting unit includes: a specification converting unit which converts the database processing request issued from the application program from its database operation language into the second database operation language; a new protocol converting unit which converts the database processing request from its protocol into the database dependent protocol suitable for the new database server and converts the data processing result of the new database server from its protocol into the database independent protocol; an old protocol converting unit which converts the database processing request from its protocol into the database dependent protocol suitable for the old database server and converts the data processing result of the old database server from its protocol into the database independent protocol; a verifying unit which compares and verifies the data processing results of the new database server and the old database server converted from their protocol into the database independent protocol; an output unit which outputs the comparison and verification result of the verifying unit; and a control unit which controls processing according to the designated mode among the first mode and the second mode.

According to the present invention, there is provided a first database access method in a computer system that includes one or more application servers on which an application program that issues a database processing request conforming to a first database operation language in accordance with a database independent protocol runs and a database server which receives a database processing request conforming to a second database operation language in accordance with a database dependent protocol. A database connecting unit converts the database processing request issued from the application program from its database operation language into the second database operation language and then converts the database processing request from its protocol into the database dependent protocol to provide the database processing request to the database server, and converts the data processing result of the database server from its protocol into the database independent protocol to return the data processing result to the application program.

According to the present invention, there is provided a second database access method in a computer system that includes one or more application servers on which an application program that issues a database processing request conforming to a first database operation language in accordance with a database independent protocol runs, an old database server which receives the database processing request conforming to the first database operation language in accordance with a database dependent protocol, and a new database server which receives a database processing request conforming to a second database operation language in accordance with the database dependent protocol. A database connecting unit multiplexes the database processing requests issued from the application program, converts one database processing request from its protocol into the database dependant protocol suitable for the old database server to provide the database processing request to the old database server, converts the other database processing request from its protocol into the database dependent protocol suitable for the new database server to provide the database processing request to the new database server, converts the data processing results of the old database server and the new database server from its protocol into the database independent protocol and compares and verifies the data processing results to output the comparison and verification result, and returns the data processing result of the old database server converted from its protocol into the database independent protocol to the application program when a first mode is designated, and the database connecting unit converts the database processing request issued from the application program from its database operation language into the second database operation language and converts the database processing request from its protocol into the database dependant protocol suitable for the new database server to provide the database processing request to the new database server, and converts the data processing result of the new database server from its protocol into the database independent protocol to return the data processing result to the application program when a second mode is designated.

According to the present invention, there is provided a third database access method in a computer system that includes one or more application servers on which an application program that issues a database processing request conforming to a first database operation language in accordance with a database independent protocol runs, an old database server which receives the database processing request conforming to the first database operation language in accordance with a database dependant protocol, and a new database server which receives a database processing request conforming to a second database operation language in accordance with a database dependant protocol. A database connecting unit multiplexes the database processing requests issued from the application program, converts one database processing request from its protocol into the database dependent protocol suitable for the old database server to provide the database processing request to the old database server, converts the other database processing request from its protocol into the second database operation language and converts the database processing request from its protocol into the database dependent protocol suitable for the new database server to provide the database processing request to the new database server, converts the data processing results of the old database server and the new database server from their protocol into the database independent protocol and compares and verifies the data processing results to output the comparison and verification result, and returns the data processing result of the old database server converted from its protocol into the database independent protocol to the application program when a first mode is designated, and the database connecting unit converts the database processing request issued from the application program from its database operation language into the second database operation language and converts the database processing request from its protocol into the database dependent protocol suitable for the new database server to provide the database processing request to the new database server, and converts the data processing result of the new database server from its protocol into the database independent protocol to return the data processing result to the application program when a second mode is designated.

According to the present invention, there is provided a first application server on which an application program that issues a database processing request conforming to a first database operation language in accordance with a database independent protocol runs. The first application server includes a database connecting unit which converts the database processing request issued from the application program from its database operation language into a second database operation language and converts the database processing request from its protocol into a protocol suitable for a database server that receives a database processing request conforming to the second database operation language in accordance with a database dependent protocol to provide the database processing request to the database server, and converts a protocol of the data processing result of the database server from its protocol into the database independent protocol to return the data processing result to the application program.

According to the present invention, there is provided a second application server on which an application program that issues a database processing request conforming to a first database operation language in accordance with a database independent protocol runs. The second application server includes a database connecting unit which multiplexes database processing requests issued from the application program, converts one database processing request from its protocol into the database dependent protocol suitable for an old database server that receives the database processing request conforming to the first database operation language in accordance with the database dependent protocol to provide the database processing request to the old database server, converts the other database processing request from its protocol into the database dependent protocol suitable for a new database server that receives a database processing request conforming to a second database operation language in accordance with the database dependent protocol to provide the database processing request to the new database server, converts the data processing results of the old database server and the new database server from their protocol into the database independent protocol and compares and verifies the data processing results to output the comparison and verification result, and returns the data processing result of the old database server converted from its protocol into the database independent protocol to the application program when a first mode is designated, and converts the database processing request issued from the application program from its database operation language into the second database operation language and converts the database processing request from its protocol into the database dependant protocol suitable for the new database server to provide the database processing request to the new database server, and converts the data processing result of the new database server from its protocol into the database independent protocol to return the data processing result to the application program when a second mode is designated.

According to the present invention, there is provided a third application server on which an application program that issues a database processing request conforming to a first database operation language in accordance with a database independent protocol runs. The third application server includes a database connecting unit which multiplexes database processing requests issued from the application program, converts one database processing request from its protocol into the database dependant protocol suitable for an old database server that receives the database processing request conforming to the first database operation language in accordance with the database dependent protocol to provide the database processing request to the old database server, converts the other database processing request from its database operation language into a second database operation language and converts the database processing request from its protocol into the database dependent protocol suitable for a new database server that receives a database processing request conforming to the second database operation language in accordance with the database dependent protocol to provide the database processing request to the new database server, converts the data processing results of the old database server and the new database server from their protocol into the database independent protocol and compares and verifies the data processing results to output the comparison and verification result, and returns the data processing result of the old database server converted from its protocol into the database independent protocol to the application program when a first mode is designated, and converts the database processing request issued from the application program from its database operation language into the second database operation language and converts the database processing request from its protocol into the database dependant protocol suitable for the new database server to provide the database processing request to the new database server, and converts the data processing result of the new database server from its protocol into the database independent protocol to return the data processing result to the application program when a second mode is designated.

BRIEF DESCRIPTION OF THE DRAWINGS

The above-described objects, and other objects, features, and advantages become clear by reading exemplary embodiments described below, and the following, accompanying figures.

BEST MODE FOR CARRYING OUT THE INVENTION (First Exemplary Embodiment)

Next, a first exemplary embodiment of the present invention will be described in detail with reference to the accompanying drawings.

[Description of Configuration]

Figure 1:
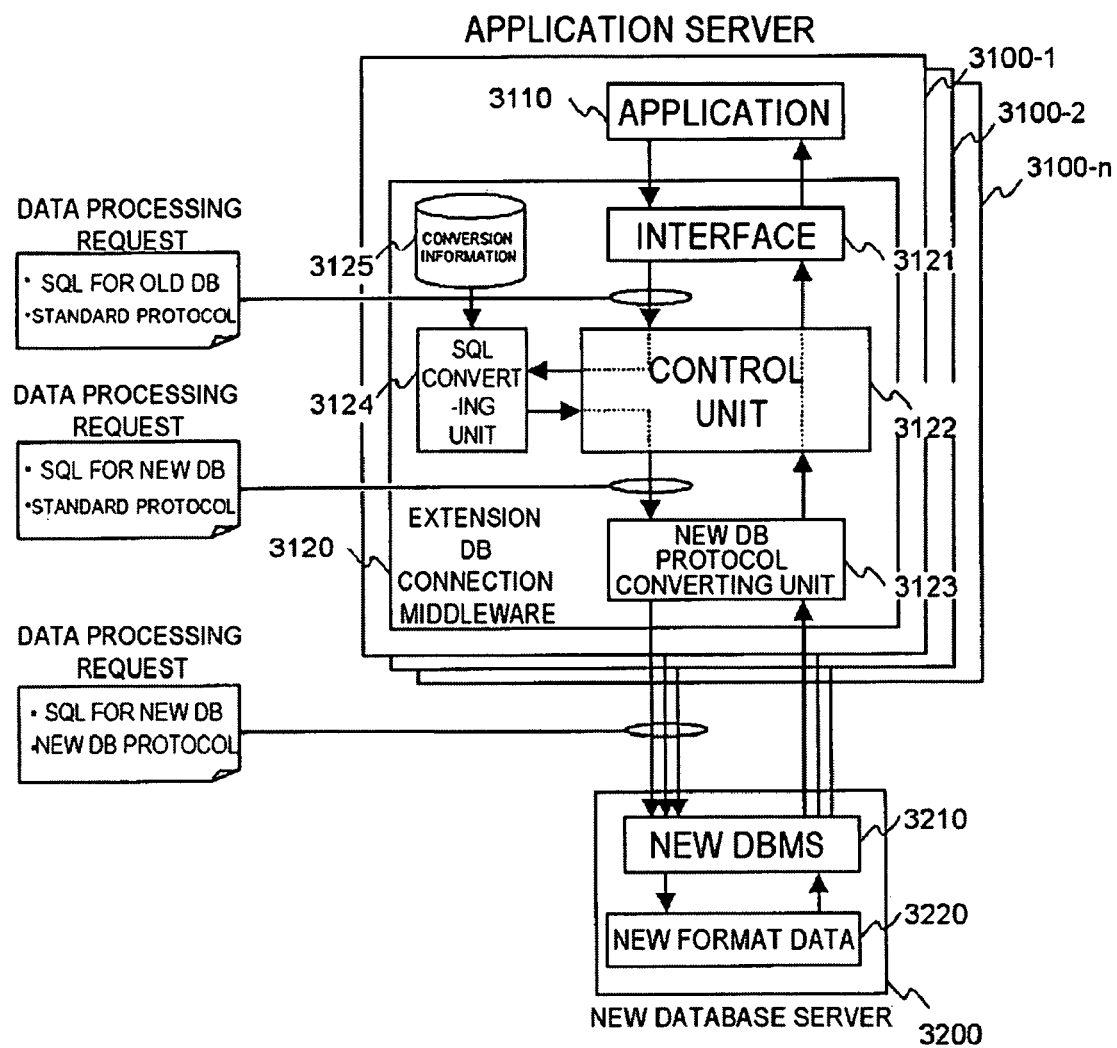
FIG. 1 is a block diagram illustrating the configuration of a first exemplary embodiment of the present invention.

FIG. 1 is a block diagram illustrating the configuration of a computer system according to an exemplary embodiment of the present invention.

The computer system according to the exemplary embodiment of the present invention includes one or more application servers 3100-1, 3100-2, and 3100-n on which an application program 3110 that issues a database processing request conforming to a first database operation language (SQL for an old DB) in accordance with a database independent protocol (standard protocol) runs, a database server (new database server 3200) that receives a database processing request conforming to a second database operation language (SQL for a new DB) in accordance with a database dependant protocol (new DB protocol), and a database connecting unit (extension DB connection middleware 3120) that converts the database processing request issued from the application program 3110 from its database operation language (SQL for the old DB) into the second database operation language (SQL for the new DB) and converts the database processing request from its protocol (standard protocol) into the database dependent protocol (new DB protocol) to provide the database processing request to the database server (new database server 3200), and converts the data processing result of the database server (new database server 3200) from its protocol (new DB protocol) into the database independent protocol (standard protocol) to return the data processing result to the application program 3110.

Further, the database connecting unit (extension DB connection middleware 3120) includes an operation language converting unit (SQL converting unit 3124) that converts the database processing request issued from the application program 3110 from its database operation language (SQL for the old DB) into the second database operation language (SQL for the new DB), a protocol converting unit (new DB protocol converting unit 3123) that converts the database processing request having been converted from its database operation language (SQL for the old DB) into the second database operation language (SQL for the new DB) from its protocol (standard protocol) into the database dependent protocol (new DB protocol) and converts the data processing result of the database server (new database server 3200) from its protocol (new DB protocol) into the database independent protocol (standard protocol), and a control unit 3122 that performs the entire control of the database connecting unit (extension DB connection middleware 3120).

Referring to FIG. 1, the computer system according to the first exemplary embodiment of the present invention includes the plurality of application servers 3100-1, 3100-2, . . . , and 3100-n and the new database server 3200.

Each of the application servers 3100-1, 3100-2, . . . , and 3100-n includes an application 3110 that performs information processing and an extension DB connection middleware 3120 that connects the application 3110 to a new DBMS 3210, which will be described in detail below.

The extension DB connection middleware 3120 includes an interface 3121 that is an interface of a standard protocol, a control unit 3122 that controls a flow of data processing request, a new DB protocol converting unit 3123 that converts the standard protocol into a unique protocol for the new DBMS 3120, an SQL converting unit 3124 that converts an SQL as a content of the data processing request, and a conversion information storage unit 3125 (hereinafter, also referred to as a "conversion information 3125") that stores conversion information as a conversion rule, which defines how to perform an SQL conversion.

The new database server 3200 includes a storage that accumulates new format data 3220 in which data necessary when the application 3110 performs the processing is converted into data of a format that can be handled by the new DBMS 3210, and a migrated new DBMS 3210 that manages the new format data 3220.

[Description of the Operation]

Figure 2:
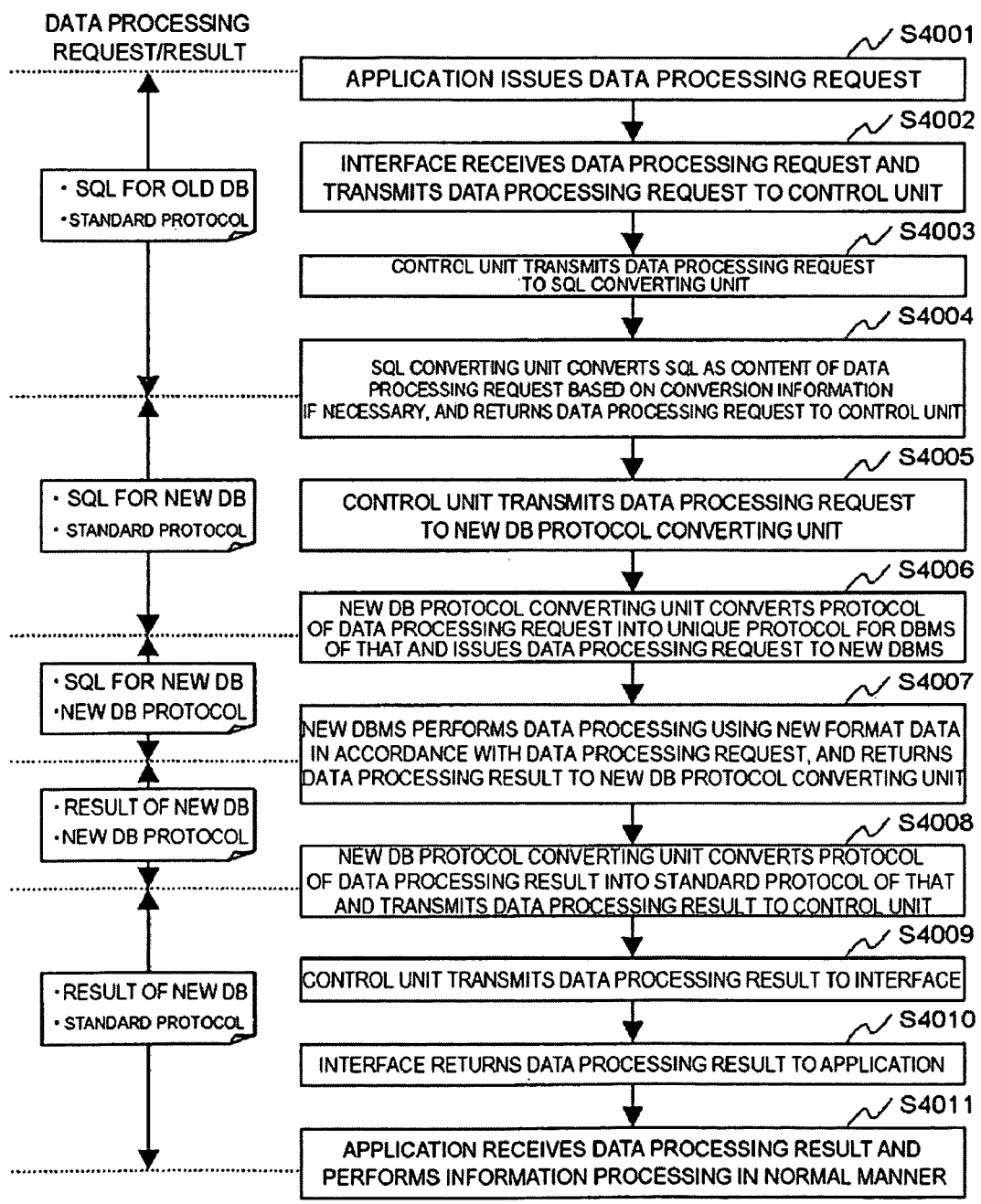
FIG. 2 is a flowchart illustrating the operation of the first exemplary embodiment of the present invention.

Next, referring to the flowcharts shown in FIGS. 1 and 2, the operation of the computer system according to this exemplary embodiment will be described in detail.

A database access method according to the exemplary embodiment of the present invention is a database access method in the computer system that includes one or more application servers 3100-1, 3100-2, and 3100-n on which the application program 3110 that issues the database processing request conforming to the first database operation language (SQL for the old DB) in accordance with the database independent protocol (standard protocol) runs and the database server (new database server 3200) that receives the database processing request conforming to the second database operation language (SQL for the new DB) in accordance with the database dependent protocol (new DB protocol). In the database access method, the database connecting unit (extension DB connection middleware 3120) converts the database processing request issued from the application program 3110 from its database operation language (SQL for the old DB) into the second database operation language (SQL for the new DB) (Step S4004), then converts the database processing request from its protocol (standard protocol) into the database dependent protocol (new DB protocol) to provide the database processing request to the database server (new database server 3200) (Step S4600), and converts the data processing result of the database server (new database server 3200) from its protocol (new DB protocol) into the database independent protocol (standard protocol) to return the data processing result to the application program 3110 (Step S4008).

In the application servers 3100-1, 3100-2, . . . , and 3100-n, when the application 3110 requests the DBMS to process data, as the data processing request, the SQL for the old DBMS before the migration is issued through the DB connection middleware 3120 based on the standard protocol (Step S4001).

In the extension DB connection middleware 3120, the interface 3121 receives the data processing request and transmits the received data processing request to the control unit 3122 (Step S4002).

In general, the DB connection middleware is disposed in each of the application servers 3100-1, 3100-2, . . . , and 3100-n, and the application 3110 issues data processing request to an interface for a standard protocol that is included in a general DB connection middleware.

Since the extension DB connection middleware 3120 includes the same interface 3121 as the interface of the general DB connection middleware, the extension DB connection middleware 3120 is recognized from the application 3110, similarly to the general DB connection middleware.

For this reason, the internal operation of the extension DB connection middleware 3120 other than the interface 3121 is unrecognized from the application 3110 and is transparent. That is, the application does not need to be changed in order to introduce the extension DB connection middleware 3120.

Further, since it is assumed that the extension DB connection middleware is replaced in a library in order to be compatible with various kinds of DBMSs, the extension DB connection middleware can be easily introduced. That is, instead of replacing the old DB protocol converting unit with the new DB protocol converting unit 3123, the old DB protocol converting unit is replaced with a constituent element (including the new DB protocol converting unit), such as the control unit 3122, which realizes a function of the extension DB connection middleware. Of course, the extension DB connection middleware may be newly created instead of the replacement.

The control unit 3122 that has received the data processing request transmits the data processing request to the SQL converting unit 3124 (Step S4003).

The SQL converting unit 3124 that has received the data processing request investigates the SQL as the content of the data processing request, and performs an SQL conversion based on the conversion information 3125, if necessary (Step S4004). At this time, since the data processing request is not a DBMS unique protocol whose specification is not opened but a standard protocol whose specification is opened, it is easy to investigate or convert the content of the data processing request.

A specific example of a conversion that is performed by the SQL converting unit 3124 is described. For example, in the case where the SQL that is the content of the data processing request for the old DBMS issued by the application is described as SELECT DECODE (key, val1, res1, res2) label FROM table1 using an original extension function DECODE that does not exist in the standard SQL and the extension function DECODE cannot be interpreted in a migrated new DBMS, the SQL converting unit 3124 converts SELECT DECODE (key, val1, res1, res2) label FROM table1 into SELECT CASE WHEN key=val1 THEN res1 ELSE res2 END label FROM table2 based on a rule indicating a "conversion to a standard function CASE that can be interpreted even in the new DBMS", when "extension function DECODE" of the conversion information 3125 exists.

After the SQL conversion, the SQL converting unit 3124 returns the converted data processing request to the control unit 3122.

The control unit 3122 that has received the converted data processing request transmits the converted data processing request to the new DB protocol converting unit 3123 (Step S4005).

The new DB protocol converting unit 3123 that has received the data processing request converts the data processing request from the standard protocol into the unique protocol for the new DBMS 3210 and issues it to the new DBMS 3210 (Step S4006).

In the new database server 3200, the new DBMS 3210 that has received the data processing request of the unique protocol interprets the SQL of the data processing request, performs data processing using the managed new format data 3220 in accordance with the corresponding request to produce a result as a data processing result, and returns the data processing result of the unique protocol to the new DB protocol converting unit 3123 (Step S4007).

The new DB protocol converting unit 3123 that has received the data processing result of the unique protocol converts the data processing result from its protocol into the standard protocol and transmits the data processing result to the control unit 3122 (Step 34008).

The control unit 3122 that has received the data processing result of the standard protocol transmits the data processing result to the interface 3121 (Step S4009).

The interface 3121 that has received the data processing result returns the data processing result to the application 3110 (Step S4010).

The application 3110 receives the same data processing result as that in the case where the data processing request is issued to the old DBMS and performs information processing in the normal manner (Step S4011).

By this operation, even in the computer system that is migrated to the new DBMS, it is possible to continuously operate the computer system transparently without changing the application and versatilely irrespective of the kinds of the new or old DBMSs.

[Description of an Effect]

Next, an effect of this exemplary embodiment will be described.

According to this exemplary embodiment, in the DB connection middleware, it is possible to continuously operate the computer system transparently without changing the application, even if the DBMS is migrated to the new DBMS, by converting the SQL as the content of the data processing request issued by the application into the SQL for the new DBMS from the SQL for the old DBMS and allowing the converted SQL to be interpreted even in the new DBMS after the migration.

Further, since the SQL conversion is performed when the data processing request is at a stage of the standard protocol, the data processing request in which the SQL is converted is converted from its protocol into the unique protocol for the DBMS using the protocol converting unit according to the DBMS, and the data processing request is issued to the DBMS, the computer system can be versatilely applied using the same mechanism irrespective of the kind of the DBMS.

Since the mechanism for performing the SQL conversion is dispersed for each application server, a bottleneck does not exist and scalability is excellent. Further, since a single fault point does not exist, fault tolerance is also excellent.

As described above, in the computer system according to this exemplary embodiment, in a state where the database server is migrated from the old database server to the new database server, the database processing request that is issued from the application program is converted from its the database operation language into the database operation language that is suitable for the new database server at a stage of the database independent protocol, and the protocol is then converted from the database independent protocol to the new database dependent protocol, thereby providing the database processing request to the new database server.

According to the computer system according to this exemplary embodiment, in the computer system on which an application that performs information processing together with the DBMS runs, when the currently used old DBMS is migrated to the other new DBMS, it is possible to continuously operate an information system by migrating the DBMS transparently without changing the application and versatilely irrespective of the kinds of the new and old DBMSs. For this reason, the computer system can be easily applied to the existing system.

The reason is as follows. In the database connecting unit, the database operation language (SQL or the like) as the content of the database processing request that is issued by the application is converted into the database operation language for the new DBMS from the database operation language for the old DBMS, the conversion is performed when the data processing request is at a stage of the database independent protocol, the data processing request in which the database operation language is converted is converted from its protocol into the unique protocol for the DBMS using the protocol converting unit according to the DBMS, and the data processing request is issued to the DBMS.

(Second Exemplary Embodiment)

Next, a second exemplary embodiment of the present invention will be described in detail with reference to the accompanying drawings.

[Description of the Configuration]

Figure 3:
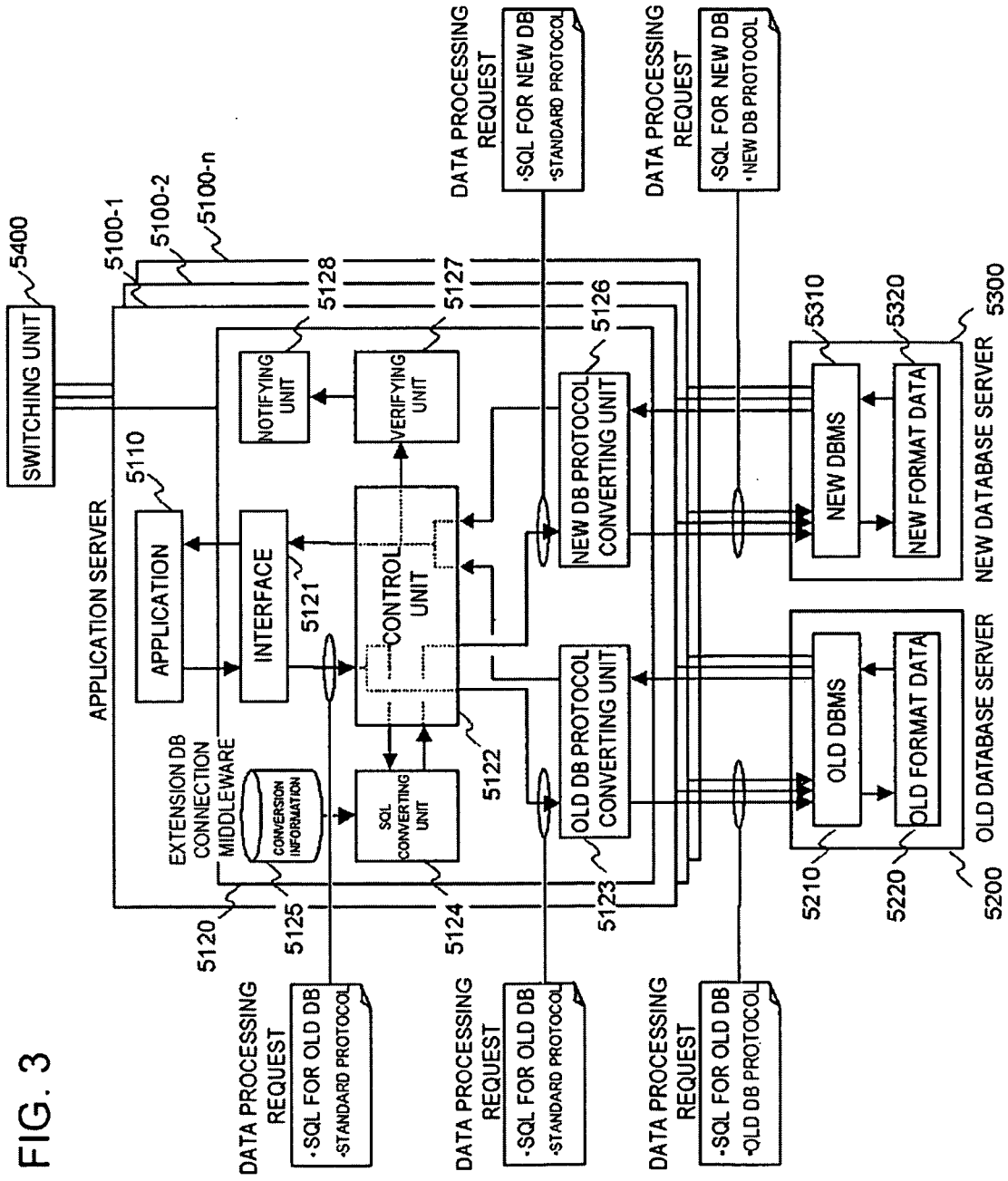
FIG. 3 is a block diagram illustrating the configuration of a second exemplary embodiment of the present invention.

FIG. 3 is a block diagram illustrating the configuration of a computer system according to an exemplary embodiment of the present invention.

The computer system according to the exemplary embodiment of the present invention includes one or more application servers 5100-1, 5100-2, and 5100-n on which an application program 5110 that issues a database processing request conforming to a first database operation language (SQL for an old DB) in accordance with a database independent protocol (standard protocol) runs, an old database server 5200 that receives a database processing request conforming to the first database operation language (SQL for an old DB) in accordance with a database dependant protocol (old DB protocol), a new database server 5300 that receives a database processing request conforming to a second database operation language (SQL for a new DB) in accordance with a database dependant protocol (new DB protocol), and a database connecting unit (extension DB connection middleware 5120) that multiplexes the database processing requests issued from the application program 5110, converts one database processing request from its protocol into the database dependant protocol (old DB protocol) suitable for the old database server 5200 to provide the data processing result to the old database server 5200, converts the other database processing request from its protocol into the database dependant protocol (new DB protocol) suitable for the new database server 5300 to provide the database processing request to the new database server 5300, converts the data processing results of the old database server 5200 and the new database server 5300 from their protocol into database independent protocol (standard protocol) and compares and verifies the data processing results to output the comparison and verification result, and returns the data processing result of the old database server 5200 converted from its protocol into the database independent protocol (standard protocol) to the application program 5110 when a first mode (preparation or verification mode) is designated, and converts the database processing request issued from the application program 5110 from its database operation language into the second database operation language (SQL for the new DB) and converts the database processing request from its protocol into the database dependant protocol (new DB protocol) suitable for the new database server 5300 to provide the database processing request to the new database server 5300, converts the data processing result of the new database server 5300 from its protocol into the database independent protocol (standard protocol) to return the data processing result to the application program 5110 when a second mode (migration mode) is designated.

Referring to FIG. 3, the computer system according to the second exemplary embodiment of the present invention includes the plurality of application servers 5100-1, 5100-2, . . . , and 5100-n, the old database server 5200, the new database server 5300, and the switching unit 5400 that controls the extension DB connection middleware 5120 (which will be described in detail below) of each of the plurality of application servers 5100-1, 5100-2, . . . , and 5100-n.

Each of the application servers 5100-1, 5100-2, . . . , and 5100-n includes the application 5110 that performs information processing and the extension DB connection middleware 5120 that connects the application 5110 to the old DBMS 5210 (which will be described in detail below) and the new DBMS 5310 (which will be described in detail below).

The database connecting unit (extension DB connection middleware 5120) includes a specification converting unit (SQL converting unit 5124) that converts the database processing request issued from the application program 5110 from its database operation language (SQL for the old DB) into the second database operation language (SQL for the new DB), a new protocol converting unit (new DB protocol converting unit 5126) that converts the database processing request from its protocol (standard protocol) into the database dependant protocol (new DB protocol) suitable for the new database server 5300 and converts data processing result of the new database server 5300 from its protocol (new DB protocol) into the database independent protocol (standard protocol), an old protocol converting unit (old DB protocol converting unit 5123) that converts the database processing request from its protocol (standard protocol) into the database dependant protocol (old DB protocol) suitable for the old database server 5200 and converts the data processing result of the old database server 5200 from its protocol (old DB protocol) into the database independent protocol (standard protocol), a verifying unit 5127 that compares and verifies the data processing results of the new database server 5300 and the old database server 5200 converted from its protocol into the database independent protocol (standard protocol), an output unit (notifying unit 5128) that outputs the comparison and verification result of the verifying unit 5127, and a control unit (control unit 5122) that controls processing according to the designated mode among the first mode (preparation or verification mode) and the second mode (migration mode).

Specifically, the extension DB connection middleware 5120 includes an interface 5121 that is an interface of a standard protocol, a control unit 5122 that controls a flow of data processing request, an old DB protocol converting unit 5123 that converts the standard protocol into a unique protocol for the old DBMS 5210, a new DB protocol converting unit 5126 that converts the standard protocol into a unique protocol for the new DBMS 5310, an SQL converting unit 5124 that converts an SQL as a content of the data processing request, a conversion information storage unit 5125 (hereinafter, referred to as a "conversion information 5125") that stores conversion information as a conversion rule, which defines how to perform an SQL conversion, a verifying unit 5127 that compares and verifies the data processing results, and a notifying unit 5128 that notifies the verification result.

The old database server 5200 includes a storage that accumulates old format data 3220 as data necessary when the application 5110 performs the processing and the old DBMS 5210 before a migration that manages the old format data 5220.

The new database server 5300 includes a storage that accumulates new format data 5320 in which the old format data 5220 is converted into data of a format that can be handled by the new DBMS 5310, and a migrated new DBMS 5310 that manages the new format data 5320.

[Description of the Operation]

Next, referring to the flowcharts shown in FIGS. 3 and 4 to 8, the operation of the computer system according to this exemplary embodiment will be described in detail.

A database access method according to the exemplary embodiment of the present invention is a database access method in the computer system that includes one or more application servers 5100-1, 5100-2, and 5100-n on which the application program 5110 that issues the database processing request conforming to the first database operation language (SQL for the old DB) in accordance with the database independent protocol (standard protocol) runs, the old database server 5200 that receives a database processing request conforming to the first database operation language (SQL for the old DB) in accordance with a database dependant protocol (old DB protocol), and the new database server 5300 that receives a database processing request conforming to the second database operation language (SQL for the new DB) in accordance with a database dependant protocol (new DB protocol). The database connecting unit (extension DB connection middleware 5120) multiplexes the database processing requests issued from the application program 5110 (Step S6003), converts one database processing request from its protocol into the database dependant protocol (old DB protocol) suitable for the old database server 5200 to provide the database processing request to the old database server 5200 (Step S6101), converts the other database processing request from its protocol into the database dependant protocol (new DB protocol) suitable for the new database server 5300 to provide the database processing request to the new database server 5300 (Step S6201), converts the data processing results of the old database server 5200 and the new database server 5300 from their protocol into the database independent protocol (standard protocol) and compares and verifies the database independent protocols (Steps S6103, S6203, S6004, and S6005), outputs the comparison and verification result (Step S6006), and returns the data processing result of the old database server 5200 converted from its protocol into the database independent protocol (standard protocol) to the application program 5110 (Steps S6007 and S6008) when a first mode (preparation or verification mode) is designated, and converts the database processing request issued from the application program 5110 from its database operation language into the second database operation language (SQL for the new DB) (Step S7201), converts the database processing request from its protocol into the database dependant protocol (new DB protocol) suitable for the new database server 5300 to provide the database processing request to the new database server 5300 (Step S7203), and converts the data processing result of the new database server 5300 from its protocol into the database independent protocol (standard protocol) to return the data processing result to the application program 5110 (Step S7205) when a second mode (migration mode) is designated.

According to this exemplary embodiment, the following three modes of operations are performed.

1. Preparation Mode

A mode in which, as a preparation for DBMS migration work, an old SQL that needs to be converted in accordance with the migration is discovered in an actual operation environment.

2. Verification Mode

A mode in which, as the DBMS migration work, it is verified whether an SQL conversion is performed based on a set conversion rule in an actual operation environment.

3. Migration Mode

A mode in which a DBMS is migrated to a completely new DBMS.

Each of the modes is changed by switching the operation of the control unit 5122 by the switching unit 5400. The switching operation may be performed by the determination of a person, or may be performed by monitoring a state of the application or the extension DB connection middleware and performing an automatic determination based on the monitored result.

[Preparation Mode]

First, referring to the flowcharts shown in FIGS. 3, 4, and 5, the operation of the preparation mode according to this exemplary embodiment will be described in detail.

In the application servers 5100-1, 5100-2, . . . , and 5100-n, when the application 5110 requests the DBMS to process data, as the data processing request, the SQL for the old DBMS 5210 before a migration is issued through the DB connection middleware 5120 with the standard protocol (Step S6001).

In the extension DB connection middleware 5120, the interface 5121 receives the data processing request and transmits the data processing request to the control unit 5122 (Step S6002).

The control unit 5122 that has received the data processing request multiplexes the data processing requests and transmits the data processing requests to the old DB protocol converting unit 5123 and the new DB protocol converting unit 5126, respectively (Step S6003).

The old DB protocol converting unit 5123 that has received one of the multiplexed data processing requests converts the data processing request from the standard protocol into the unique protocol for the old DBMS 5210 and issues the data processing request to the old DBMS 5210 (Step S6101).

In the old database server 5200, the old DBMS 5210 that has received the data processing request of the unique protocol interprets the SQL of the data processing request, performs data processing using the managed old format data 5220 in accordance with the corresponding request to produce a result as a data processing result, and returns the data processing result to the old DB protocol converting unit 5123 based on the unique protocol (Step S6102).

The old DB protocol converting unit 5123 that has received the data processing result of the unique protocol converts the data processing result from its protocol into the standard protocol and transmits the data processing result to the control unit 5122 (Step S6103).

Further, the new DB protocol converting unit 5126 that has received the other one of the multiplexed data processing requests converts the data processing request from the standard protocol into the unique protocol for the new DBMS 5310 and issues the data processing request to the new DBMS 5310 (Step S6201).

In the new database server 5300, the new DBMS 5310 that has received the data processing request of the unique protocol interprets the SQL of the data processing request, performs data processing using the managed new format data 5320 in accordance with the corresponding request to produce a result as a data processing result, and returns the data processing result of the unique protocol to the new DB protocol converting unit 5126 (Step S6202).

Further, since the received data processing request is described in the SQL for the old DBMS 5210, the data processing request cannot be interpreted in the new DBMS, and an error as the data processing result may be returned.

The new DB protocol converting unit 5126 that has received the data processing result of the unique protocol converts the data processing result from its protocol into the standard protocol and transmits the data processing result to the control unit 5122 (Step S6203).

The control unit 5122 that has received both the data processing result from the old DBMS 5210 and the data processing result from the new DBMS 5310 transmits both the data processing results to the verifying unit 5127 (Step S6004).

The verifying unit 5127 investigates the contents of the data processing results from both the DBMSs and compares and verifies the data processing results. At this time, since each data processing result is not a DBMS unique protocol whose specification is not opened but a standard protocol whose specification is opened, it is easy to investigate and compare the data processing results (Step S6005). In addition to the comparison and verification of the data processing results, data processing times necessary until the data processing results are returned after the data processing requests are provided may be measured and compared, and the SQL that needs extremely long processing time may be determined as an SQL in which it is better to perform a conversion for performance tuning, and the determination may be output as the comparison and verification result.

The notifying unit 5128 receives the data processing requests as the origins of both the compared and verified data processing results from the control unit 5122, and notifies a message indicating the data processing requests and the comparison and verification result (whether the data processing results from both the DBMSs are the same or different) by, for example, displaying this message on a console or recording the data processing requests and the comparison and verification result in a log file (Step S6006).

Further, the notifying unit 5128 may not continuously notify the comparison and verification result, but notify the comparison and verification result only when the data processing results are different from each other.

Further, the notifying unit 5128 may change a notification destination or a notification condition in accordance with a situation. For example, in the case where a conversion rule, such as the preparation mode, is not set, the verification results are recorded in the log file if the verification results are different from each other. All of the verification results are recorded in the log file while the conversion rule is verified in the verification mode. After the conversion rule is set, the verification results are for example notified to a manager through an e-mail message, only when the verification results are different from each other.

Meanwhile, the control unit 5122 transmits only the data processing result from the old DBMS 5210 among the data processing results from both the DBMSs to the interface 5121 (Step S6007).

The interface 5121 that has received the data processing result returns the data processing result to the application 5110 (Step S6008).

The application 5110 receives the same data processing result as that in the case where the data processing request is issued to the single body of the old DBMS 5210, and performs information processing in the normal manner (Step S6009).

By this operation, while the data processing request is provided to the old DBMS and the computer system is continuously operated using the processing result, the data processing request is also provided to the new DBMS and the processing result is compared with the processing result of the old DBMS and the verification operation is performed, thereby specifying an SQL in which the processing results are different from each other as an SQL which should be converted.

[Verification Mode]

Next, referring to the flowcharts shown in FIGS. 3, 6, and 7, the operation of the verification mode according to this exemplary embodiment will be described in detail.

Figure 4:
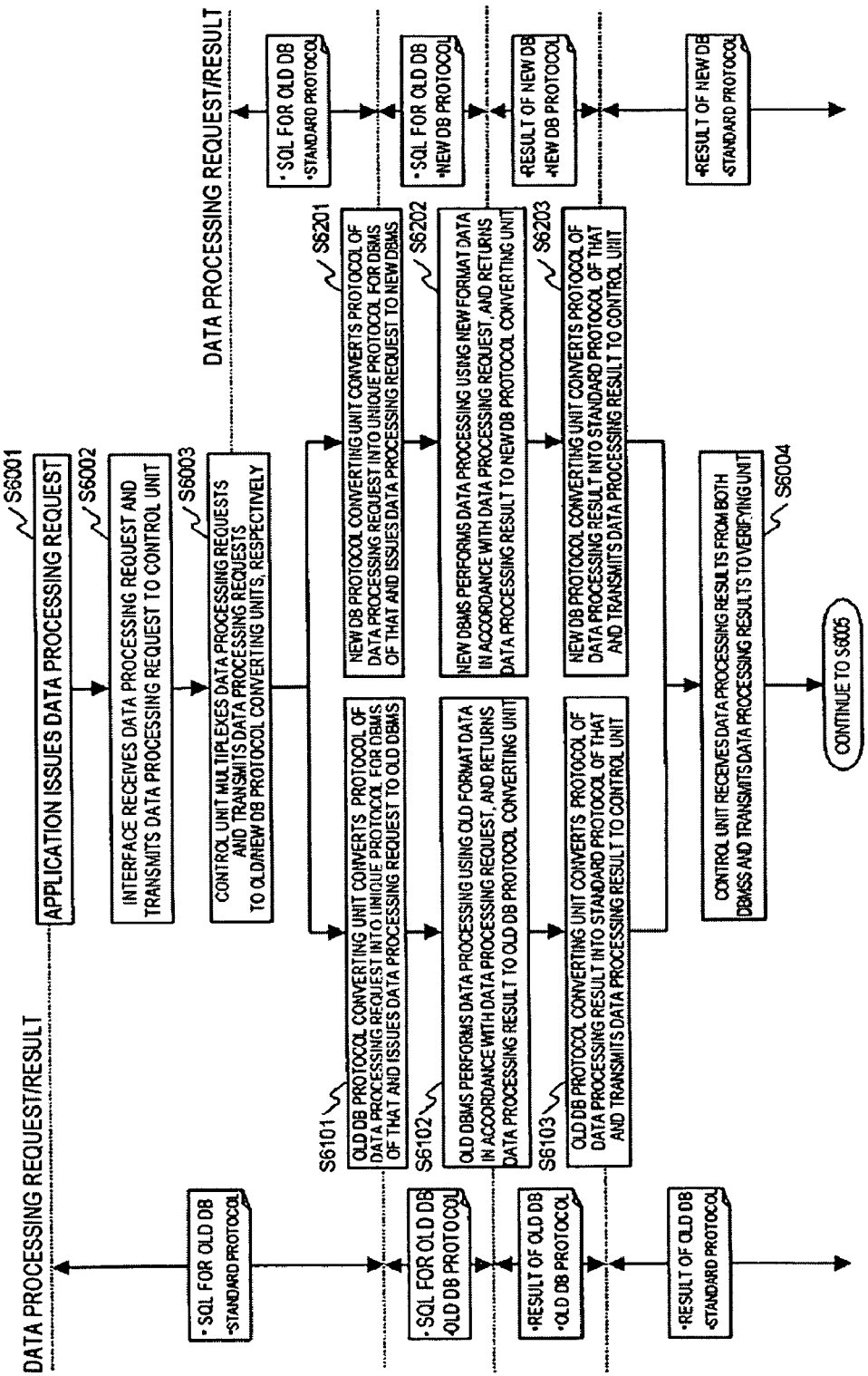
FIG. 4 is a flowchart illustrating the operation of a preparation mode of the second exemplary embodiment of the present invention.
Figure 5:
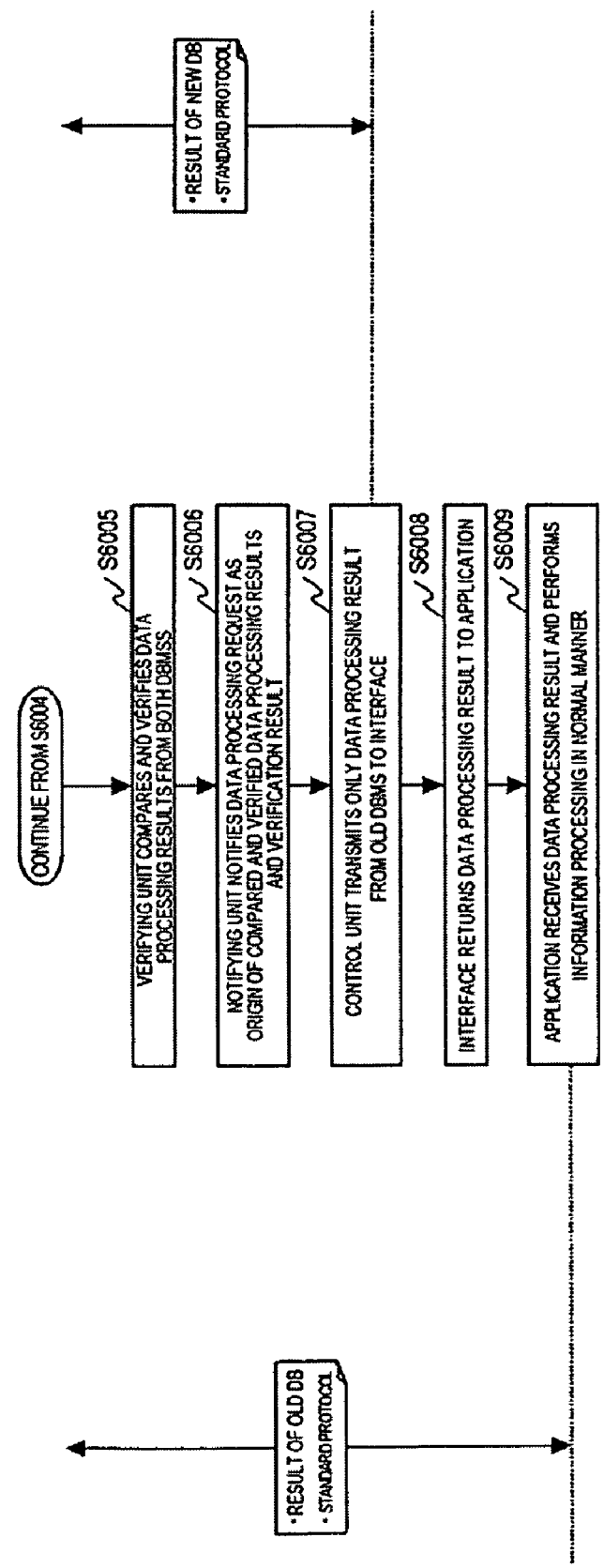
FIG. 5 is a flowchart illustrating the operation of the preparation mode of the second exemplary embodiment of the present invention.
Figure 6:
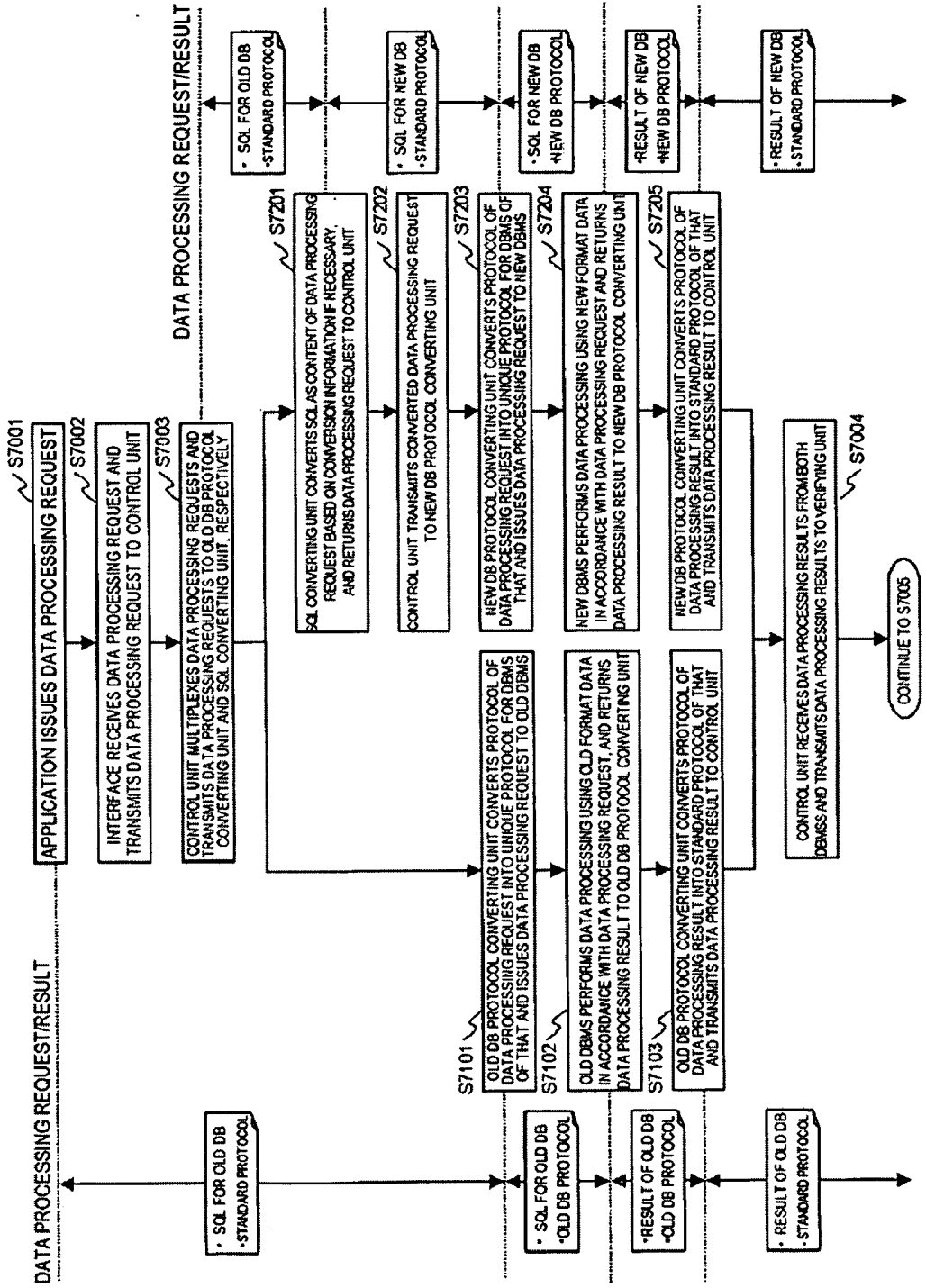
FIG. 6 is a flowchart illustrating the operation of a verification mode of the second exemplary embodiment of the present invention.
Figure 7:
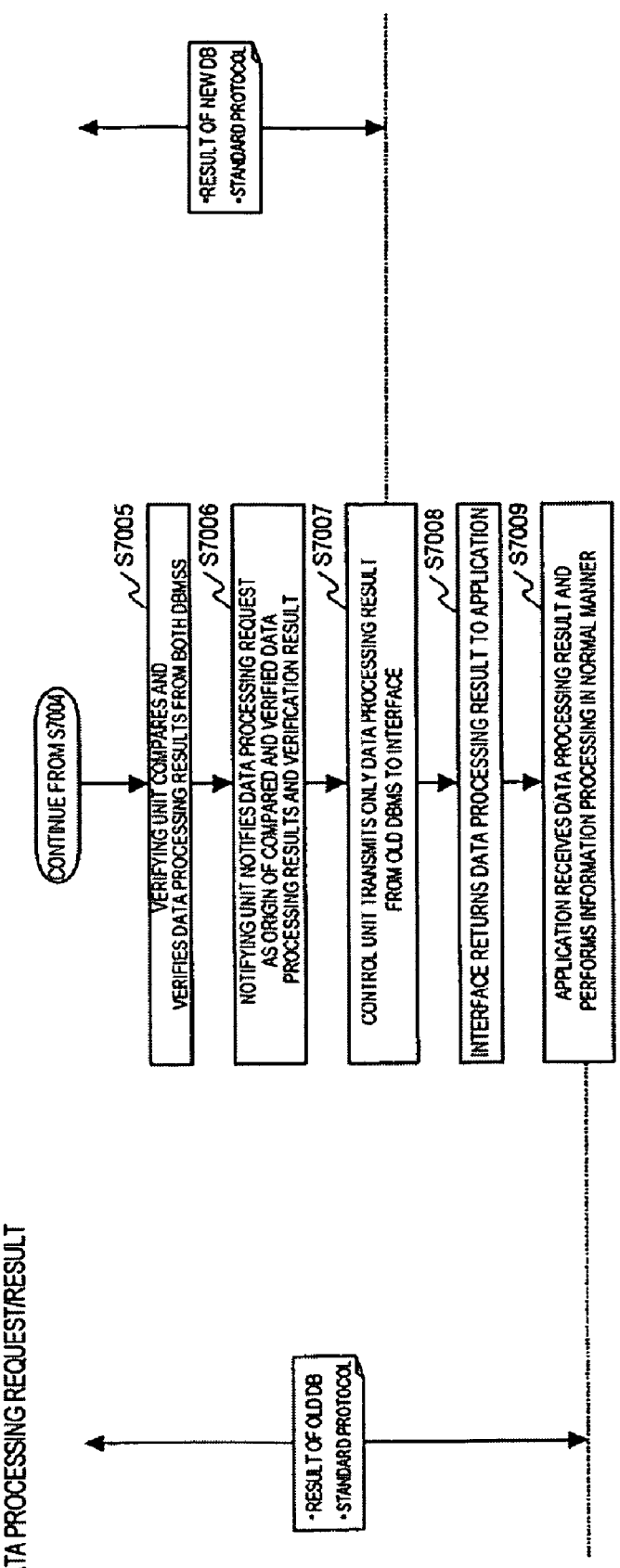
FIG. 7 is a flowchart illustrating the operation of the verification mode of the second exemplary embodiment of the present invention.

The operations shown in Steps S7001 and S7002, Steps S7101 to S7103, Step S7203 to S7205, and Step S7004 of FIG. 6 and Steps S7005 to S7009 of FIG. 7 are the same as the operations shown in Steps S6001 and S6002, Steps S6101 to S6103, Step S6201 to S6203, and Step S6004 of FIG. 4 and Steps S6005 to S6009 of FIG. 5, respectively. Accordingly, the description will not be repeated.

The control unit 5122 that has received the data processing request of the standard protocol from the interface 5121 multiplexes the data processing requests and transmits the data processing requests to the old DB protocol converting unit 5123 and the SQL converting unit 5124, respectively (Step S7003).

The SQL converting unit 5124 that has received one of the multiplexed data processing requests investigates the SQL as the content of the data processing request, and performs an SQL conversion based on the conversion information 5125, if necessary (Step S7201).

At this time, in the conversion information 5125, a conversion rule of the specified SQL to be converted is set based on the comparison and verification result acquired in the preparation mode.

After the SQL conversion, the SQL converting unit 5124 returns the converted data processing request to the control unit 5122.

The control unit 5122 that has received the converted data processing request transmits the converted data processing request to the new DB protocol converting unit 5126 (Step S7202).

By this operation, while the data processing request is provided to the old DBMS and the computer system is continuously operated using the processing result, the data processing request that is converted into the SQL for the new DBMS is provided to the now DBMS, and the processing result is compared with the processing result of the old DBMS and the verification operation is performed.

[Migration Mode]

Next, referring to the flowcharts shown in FIGS. 3 and 8, the operation of the migration mode according to this exemplary embodiment will be described in detail.

Figure 8:
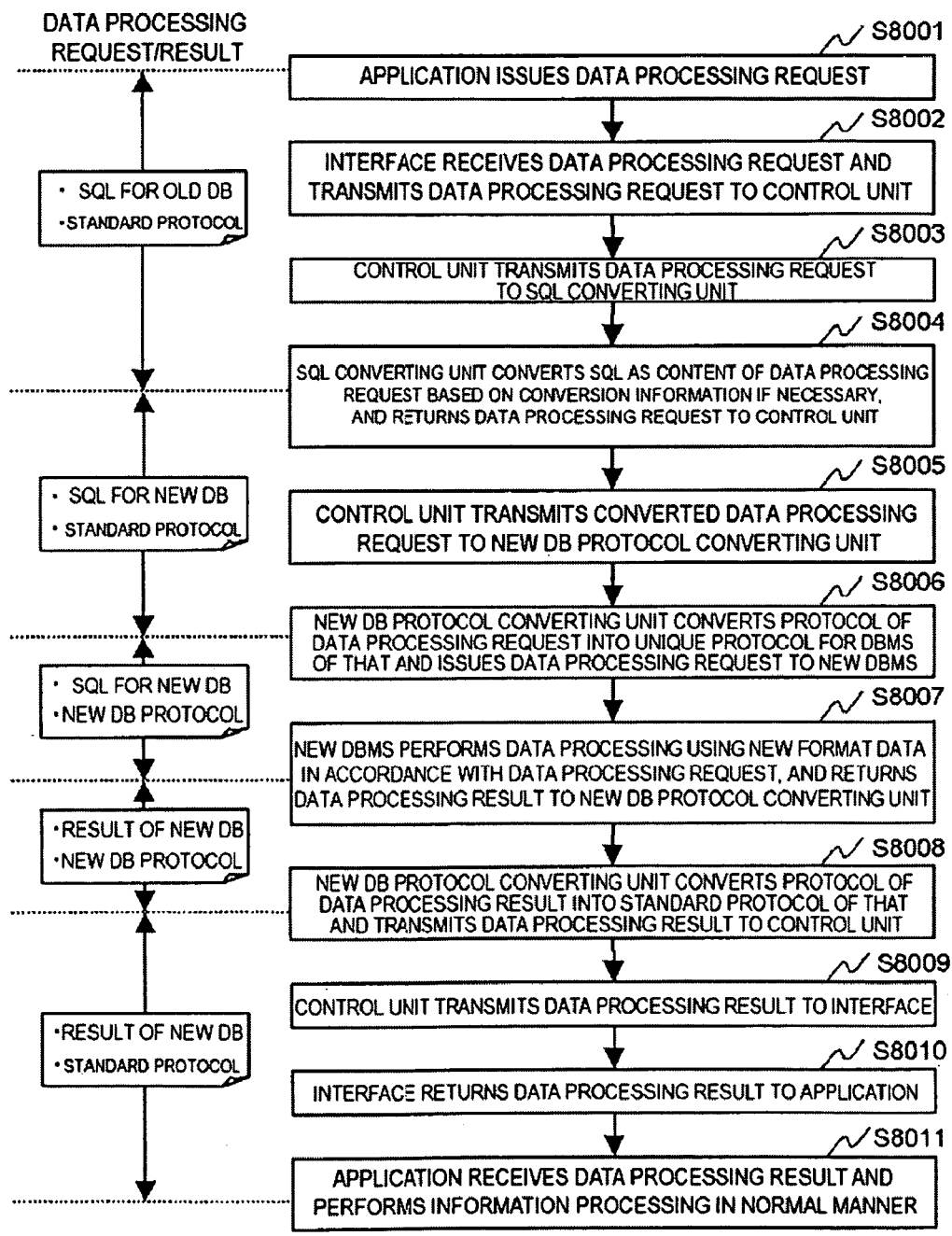
FIG. 8 is a flowchart illustrating the operation of a migration mode of the second exemplary embodiment of the present invention.

The operations shown in Steps S8001 and S8002, Steps S8004 to S8008, and Step S8010 and S8011 of FIG. 8 are the same as the operations shown in Steps S7001 and S7002, Steps S7201 to S7205 of FIG. 6 and Steps S7008 to 37009 of FIG. 7, respectively. Accordingly, the description will not be repeated.

The control unit 5122 that has received the data processing request of the standard protocol from the interface 5121 transmits the data processing request to only the SQL converting unit 5124 (Step S8003).

The control unit 5122 that has received the data processing result of the standard protocols obtained from the new DBMS 5310 from the new DB protocol converting unit 5126 returns the data processing result to the interface 5121 (Step S8009).

By this operation, a computer program is continuously operated transparently without changing the application and versatilely irrespective of the kinds of the new and old DBMSs, in the new DBMS.

[Description of an Effect]

Next, an effect of this exemplary embodiment will be described.

According to this exemplary embodiment, in addition to the effect that is obtained in the first exemplary embodiment, in the preparation mode, the data processing requests issued by the application as the SQL for the old DBMS are provided to both the old DBMS and the new DBMS, and the processing results are compared with each other and the verification operation is performed, thereby specifying an SQL in which the processing results are different from each other as an SQL which should be converted.

Further, in addition to the data processing results, data processing times necessary until the data processing results are returned after the data processing requests are provided are measured and compared, thereby specifying the SQL that needs extremely long processing time as an SQL in which it is better to perform a conversion for performance tuning.

Further, in the verification mode, the data processing request as the SQL for the old DB is provided to the old DBMS, the conversion rule of the SQL to be converted specified in the preparation mode is set as the conversion information and the data processing request subjected to an SQL conversion based on the conversion information is provided to the new DBMS, and the processing results are compared with each other and the verification operation is performed, thereby verifying whether the set conversion information is correct or not.

Further, when the conversion information is incorrect, the SQL and the conversion rule to be set again are specified from the comparison and verification result and setting and verifying are repeated, thereby brushing up the conversion rule.

In both the preparation mode and the verification mode, even if the new DBMS returns an error as the data processing result, only the data processing result of the old DBMS is returned to the application. As a result, since the information system is continuously operated without being affected by the error, the preparation and verification can be performed in an actual operation environment, not in a test environment.

Further, in the migration mode, if the SQL conversion is performed using the conversion rule accuracy of which is sufficiently verified in the verification mode, it is possible to continuously operate the information system transparently without changing the application, even if the DBMS is migrated to the new DBMS.

As described above, in the computer system according to this exemplary embodiment, in order to support migration work from the old database server to the new database server, the database processing request that is issued from the application program is multiplexed, one database processing request is provided to the old database server while the other is provided to the new database server intentionally without a conversion, and a mode in which both the data processing results are compared with each other is set, thereby performing a washout of the old database operation language to be changed to the new database operation language.

According to the computer system according to this exemplary embodiment, in addition to the effect according to the above-described exemplary embodiment, it is possible to verify whether the converted database operation language is correctly operated.

The reason is as follows. The data processing request is multiplexed, one of the data processing requests is provided to the old DBMS without a conversion and the other is converted and provided to the new DBMS, and the data processing results are compared with each other.

(Modification of a Second Exemplary Embodiment)

In the above-described second exemplary embodiment, in both the preparation mode and the verification mode, when the data processing results produced from the data processing requests respectively provided to the new DBMS 5310 and the old DBMS 5210 are different from each other, mismatch may be generated between the old format data 5220 and the new format data 5320, and subsequent data processing results may be completely different from each other. For this reason, in the preparation mode, an error may be generated in specifying the SQL to be converted, and it may become difficult to verify the SQL conversion rule in the verification mode. Accordingly, in the second exemplary embodiment, a reference is suitable for a main system, but is not suitable for a system in which updating is frequently made.

Accordingly, in the modification of the second exemplary embodiment, when the data processing results are different from each other, subsequently, the control unit 5122 does not transmit the data processing request to the new DBMS 5310.

That is, the database connecting unit (extension DB connection middleware 5120) stops further provision of database processing request to the new database server 5300, when the data processing results of the old database server 5200 and the now database server 5300 are not matched with each other during the processing of the first mode (preparation mode).

The verifying unit 5127 shown in FIG. 3 verifies whether the data processing results are matched with each other. When the data processing results of the old database server 5200 and the new database server 5300 are not matched with each other, the verifying unit 5127 instructs the control unit 5122 to stop further provision of database processing request to the new database server 5300.

As a result, thereafter, a discovering operation of the SQL that needs to be converted is stopped in the case of the preparation mode, but it is possible to prevent an error from being generated in specifying the SQL to be converted. Further, in the case of the verification mode, thereafter, the verifying operation is stopped, but it is possible to prevent a verification result of an error from being output, even though the set SQL conversion rule is correct.

Further, when the data processing results produced from the data processing requests respectively provided to the new DBMS 5310 and the old DBMS 5210 are different from each other, mismatch is generated between the old format data 5220 and the new format data 5320, in the case where the data processing request is a request to change data (UPDATE, INSERT, DELETE, and so on). Therefore, the same determining unit as a determining unit (refer to reference numeral 9129 in FIG. 9) according to a third exemplary embodiment that will be described in detail below is provided, it is determined whether the data processing request is the request to change data using the determining unit, and the control unit 5122 may not transmit the data processing request to the new DBMS 5310, only when the data processing request is the request to change data.

That is, during the processing of the first mode (preparation mode), in the case where the data processing results of the old database server 5200 and the new database server 5300 are not matched with each other, if the original database processing request is a request to change data, the database connecting unit (extension DB connection middleware 5120) stops further provision of the database processing request to the new database server 5300.

(Third Exemplary Embodiment)

Next, a third exemplary embodiment of the present invention will be described in detail with reference to the accompanying drawings.

[Description of the Configuration]

Figure 9:
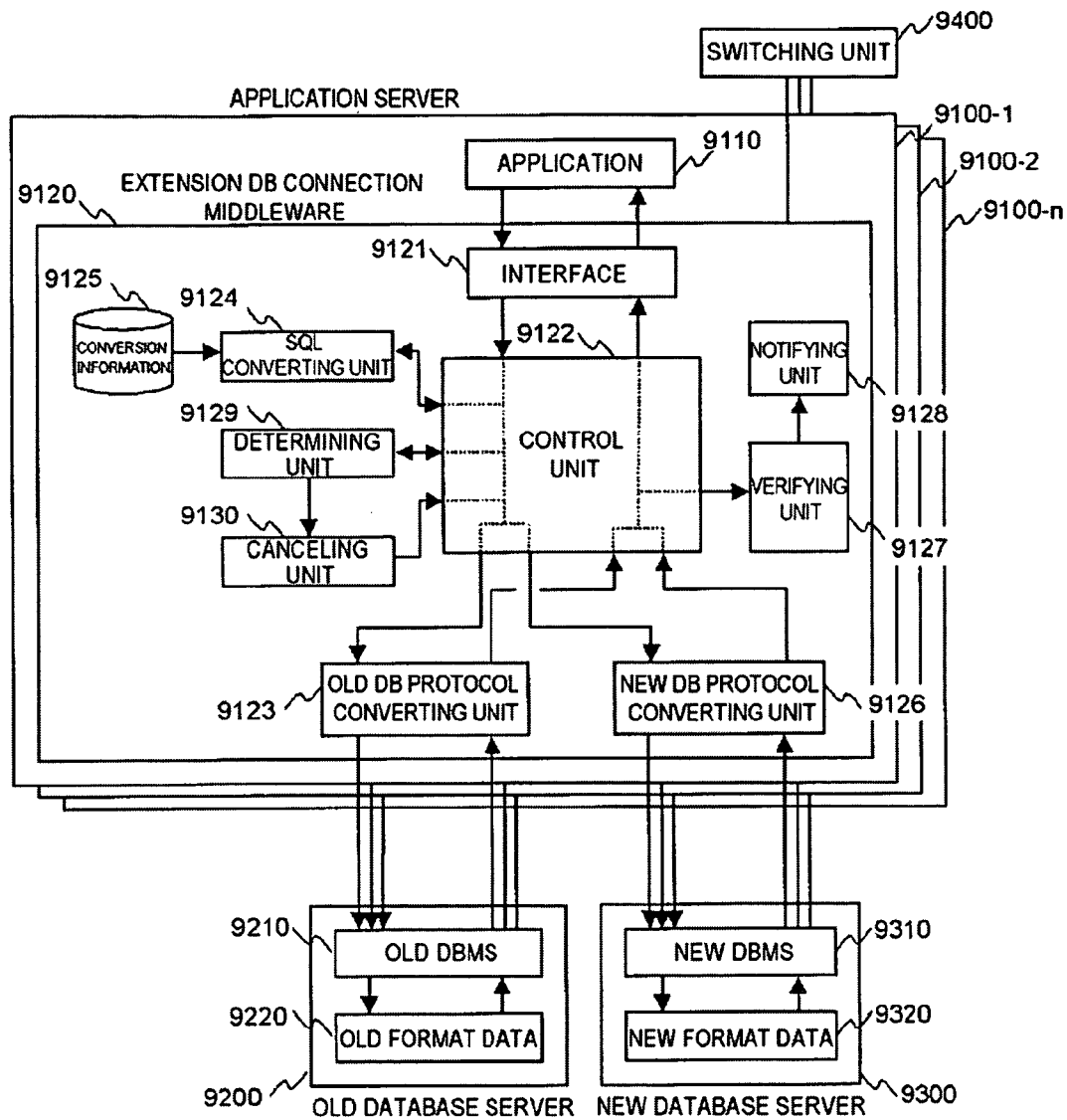
FIG. 9 is a block diagram illustrating the configuration of a third exemplary embodiment of the present invention.

FIG. 9 is a block diagram illustrating the configuration of a computer system according to an exemplary embodiment of the present invention.

A database connecting unit (extension DB connection middleware 9120) includes a determining unit 9129 that determines whether original database processing request is a request to change data, when data processing results of an old database server 9200 and a new database server 9300 are not matched with each other, during processing of a first mode (preparation mode), and a canceling unit 9130 that cancels the database processing request to the old database server 9200 and the new database server 9300, when the original database processing request is the request to change data. When the database processing request is cancelled, data processing result indicating that the database processes are not performed is returned to an application program 9110.

Referring to FIG. 9, the computer system according to the third exemplary embodiment of the present invention includes a plurality of application servers 9100-1, 9100-2, ..., and 9100-n, the old database server 9200, the new database server 9300, and a switching unit 9400 that controls an extension DB connection middleware 9120 of each of the plurality of application servers 9100-1, 9100-2, ..., and 9100-n.

Each of the servers 9100-1, 9100-2, ..., 9100-n, as well as each of all the other servers disclosed herein, can be implemented as a computing device, like a computer, as is conventional, and as can be appreciated by those of ordinary skill within the art.

For instance, typically such a server includes one or more processors (e.g., central processing units, or CPUs) and physical volatile semiconductor memory, among other types of hardware, as those of ordinary skill within the art can readily recognize. As a further example, such a server can include or be communicatively connected to a storage device, such as a hard disk drive or other non-volatile storage device, as is typical.

Each of the application servers 9100-1, 9100-2, ..., and 9100-n includes an application 9110 that performs information processing and the extension DB connection middleware 9120 that connects the application 9110 to the old DBMS 9210 and the new DBMS 9310.

The extension DB connection middleware 9120 includes an interface 9121 that is an interface of a standard protocol, a control unit 9122 that controls a flow of data processing request, an old DB protocol converting unit 9123 that converts the standard protocol into a unique protocol for the old DBMS 9210, a new DB protocol converting unit 9126 that converts the standard protocol into a unique protocol for the new DBMS 9310, an SQL converting unit 9124 that converts an SQL as a content of data processing request, a conversion information storage unit 9125 (hereinafter, also referred to as "conversion information 9125") that stores conversion information as a conversion rule, which defines how to perform an SQL conversion, a verifying unit 9127 that compares and verifies the data processing results, a notifying unit 9128 that notifies the verification result, a determining unit 9129 that identifies and determines the data processing request, and a canceling unit 9130 that cancels (rolls back) the data processing request.

The old database server 9200 includes a storage that accumulates old format data 9220 as data necessary when the application 9110 performs the processing and an old DBMS 9210 before a migration that manages the old format data 9220.

The new database server 9300 includes a storage that accumulates new format data 9320 in which the old format data 9220 is converted into data of a format that can be handled by the new DBMS 9310, and a migrated new DBMS 9310 that manages the new format data 9320.

[Description of the Operation]

Next, the operation according to this exemplary embodiment will be described in detail.

According to this exemplary embodiment, the following three modes of operations are performed.

1. Preparation Mode

A mode in which, as a preparation for DBMS migration work, an old SQL that needs to be converted in accordance with the migration is discovered in an actual operation environment.

2. Verification Mode

A mode in which, as the DBMS migration work, it is verified whether an SQL conversion is performed based on a set conversion rule in an actual operation environment.

3. Migration Mode

A mode in which a DBMS is migrated to a completely new DBMS.

Each of the modes is changed by switching the operation of the control unit 9122 by the switching unit 9400. The switching operation may be performed by the determination of a person or may be automatically performed by an external control device that monitors a state of the application or the extension DB connection middleware and performs a determination based on the monitored result.

[Preparation Mode]

First, referring to the flowcharts shown in FIGS. 9 and 10 to 12, the operation of the preparation mode according to this exemplary embodiment will be described in detail.

Figure 10:
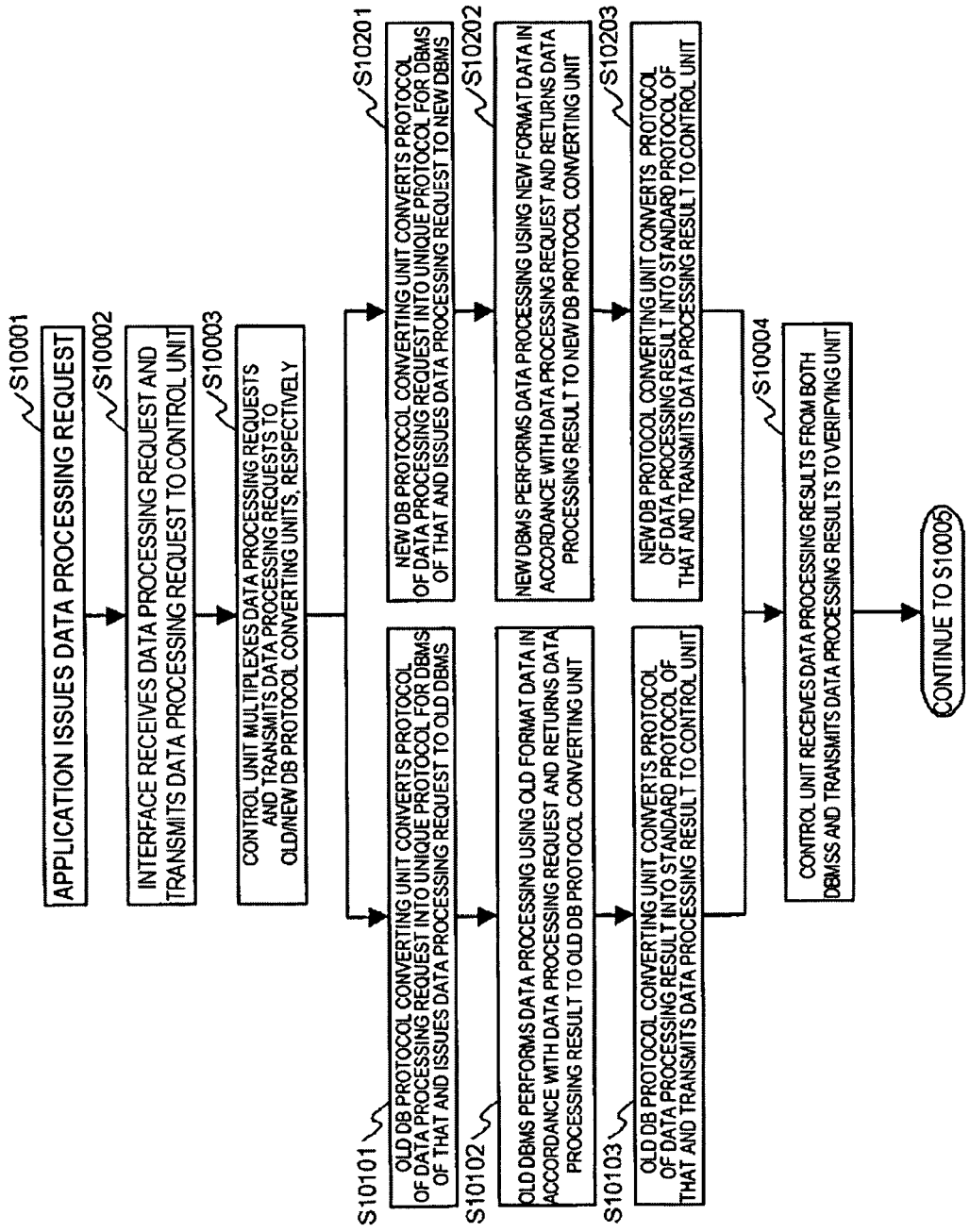
FIG. 10 is the flowchart illustrating the operation of a preparation mode of a third exemplary embodiment of the present invention.
Figure 11:
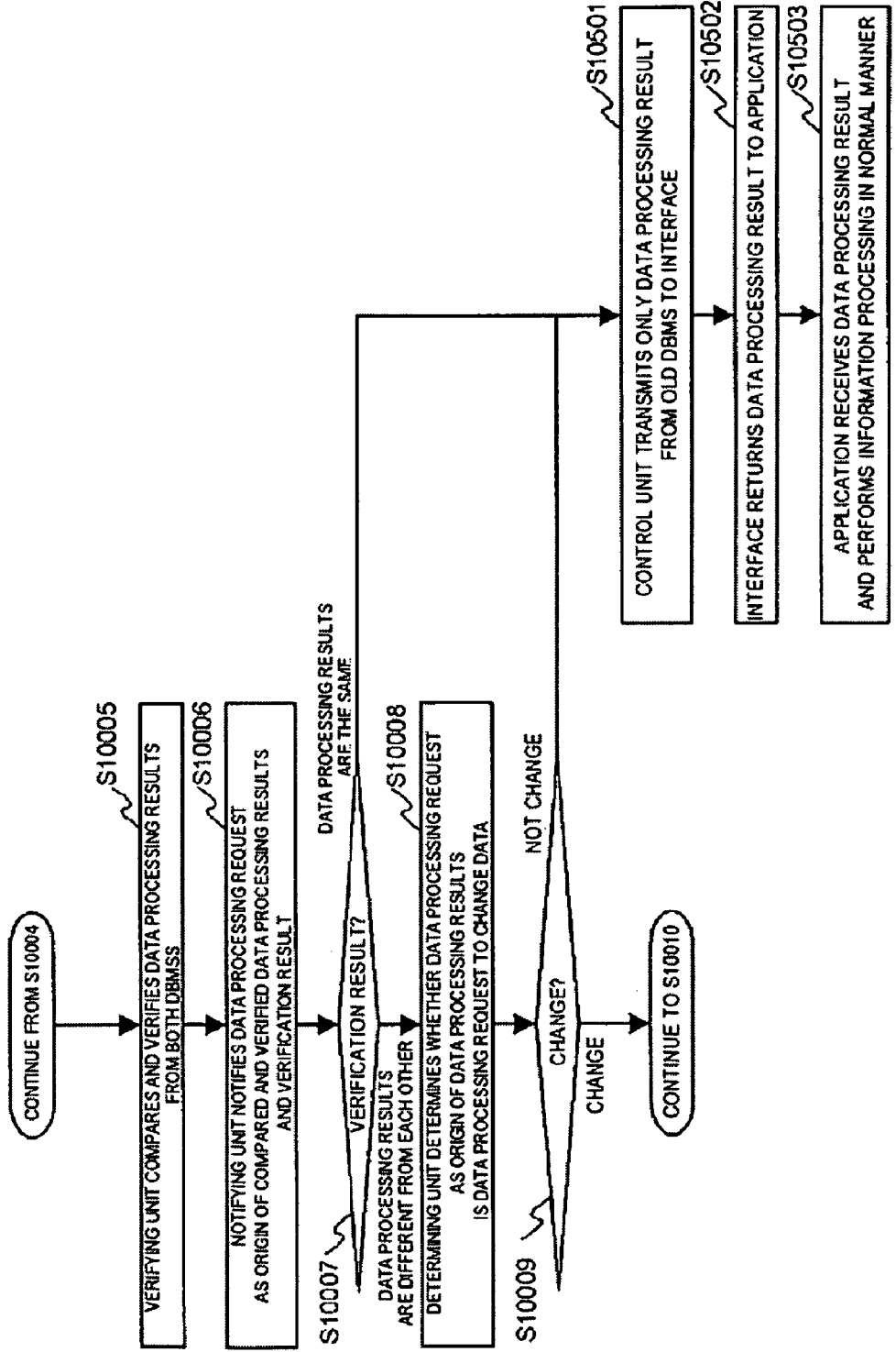
FIG. 11 is a flowchart illustrating the operation of the preparation mode of the third exemplary embodiment of the present invention.

The operations shown in Steps S10001 to S10004 of FIG. 10, Steps S10005 and S10006 of FIG. 11, and Steps S10101 to S10103 and Steps S10201 to S10203 of FIG. 10 are the same as the operations shown in Steps S6001 to S6004 of FIG. 4, Steps S6005 and S6006 of FIG. 5, and Steps S6101 to S6103 and Steps S6201 to S6203 of FIG. 4, respectively. Accordingly, the description will not be repeated.

As the result that is obtained by comparing and verifying the data processing result from the old DBMS 9210 and the data processing response from the new DBMS 9310 by the verifying unit 9127 (Step S10007), if both the data processing results are different from each other, the determining unit 9129 determines whether the data processing request as the origin of the data processing results is a data processing request (UPDATE, INSERT, and DELETE) to change data (Step S10008).

As the determination result from the determining unit 9129 (Step S10009), when the data processing request is the data processing request to change data, the canceling unit 9130 issues a data processing request (ROLLBACK and so on) to cancel the change by the data processing request with the standard protocol (Step S10010).

The control unit 9122 that has received the cancellation data processing request multiplexes the cancellation data processing requests and transmits the cancellation data processing requests to the old DB protocol converting unit 9123 and the new DB protocol converting unit 9126, respectively (Step S10011).

The old DB protocol converting unit 9123 that has received one of the multiplexed cancellation data processing requests converts the cancellation data processing request from the standard protocol into the unique protocol for the old DBMS 9210 and issues the cancellation data processing request to the old DBMS 9210 (Step S10301).

In the old database server 9200, the old DBMS 9210 that has received the cancellation data processing request of the unique protocol interprets the SQL of the cancellation data processing request, cancels the change of the old format data 9220 by the data processing performed by the old DBMS 9210 in Step S10102, in accordance with the corresponding request to produce a result as the data processing result, and returns the data processing result similarly with the unique protocol to the old DB protocol converting unit 9123 (Step S10302).

The old DB protocol converting unit 9123 that has received the data processing result of the unique protocol converts the data processing result from the unique protocol into the standard protocol and transmits the data processing result to the control unit 9122 (Step S10303).

Further, the new DB protocol converting unit 9126 that has received the other of the multiplexed cancellation data processing requests converts the cancellation data processing request from the standard protocol into the unique protocol for the new DBMS 9310 and issues the cancellation data processing request to the new DBMS 9310 (Step S10401).

In the new database server 9300, the new DBMS 9310 that has received the cancellation data processing request of the unique protocol interprets the SQL of the cancellation data processing request, cancels the change of the new format data 9320 by the data processing performed by the new DBMS 9310 in Step S10202, in accordance with the corresponding request, and returns the data processing result similarly with the unique protocol to the new DB protocol converting unit 9126 (Step S10402).

The new DB protocol converting unit 9126 that has received the data processing result of the unique protocol converts the data processing result from the unique protocol into the standard protocol and transmits the data processing result to the control unit 9122 (Step S10403).

The control unit 9122 that has received both the data processing result from the old DBMS 9210 and the data processing result from the new DBMS 9310 abandons the data processing results and issues the data processing result indicating that the data processing request cannot be performed to the interface 9121 (Step S10012).

The interface 9121 that has received the data processing result returns the data processing result to the application 9110 (Step S10013).

The application 9110 receives the data processing results, recognizes that the issued data processing request is not performed, and continuously performs information processing in the normal manner (Step S10014). At this time, the application 9110 fails to process data, but does not abnormally end the processing. This is because a response indicating that "the data processing cannot be performed" is not abnormal. The application 9110 continuously performs processing according to the result indicating that "the data processing cannot be performed". The processing result may be the application stop. However, the processing result is not an abnormal end but an assumed end.

Meanwhile, in Step S10007, when the comparison and verification result on the data processing result from the old DBMS 9210 and the data processing response from the new DBMS 9310 are the same, or when the data processing request is not the data processing request to change data in Step S10009, the control unit S9122 transmits only the data processing result from the old DBMS 9210 among the data processing results from both DBMSs to the interface 9121 (Step S10501).

The interface 9121 that has received the data processing result returns the data processing result to the application 9110 (Step S10502).

The application 9110 receives the same data processing result as that in the case where the data processing request is issued singly to the old DBMS 9210 and performs information processing in the normal manner (Step S0503).

By this operation, even if the data processing results of the old DBMS 9210 and the new DBMS 9310 are different from each other, logical consistency of the old format data 9220 and the new format data 9320 is maintained by canceling the data processes, and specification of the SQL to be converted is continued using both the DBMSs ongoingly.

[Verification Mode]

Next, referring to the flowcharts shown in FIGS. 9 and 13 to 15, the operation of the verification mode according to this exemplary embodiment will be described in detail.

Figure 12:
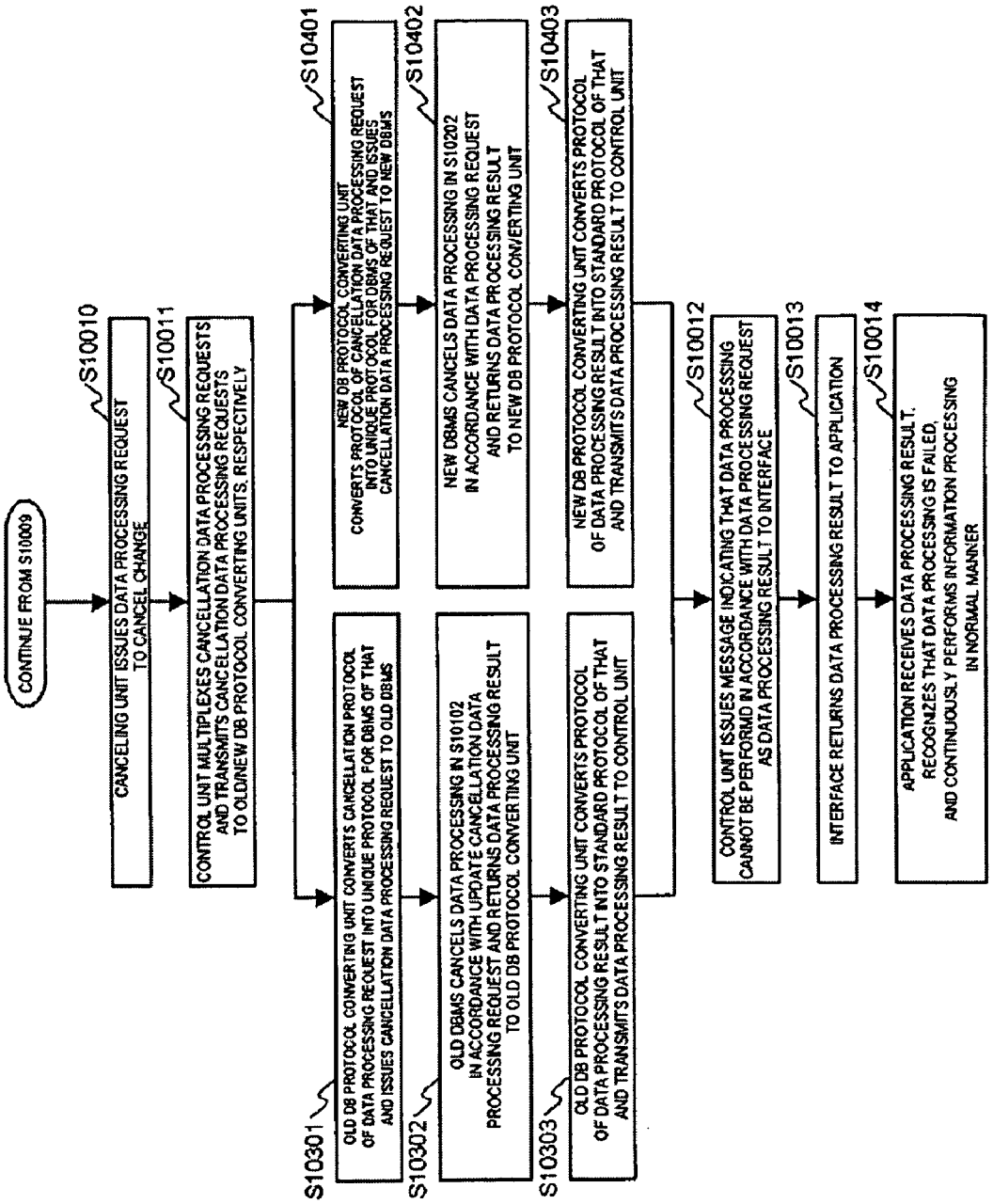
FIG. 12 is a flowchart illustrating the operation of the preparation mode of the third exemplary embodiment of the present invention.
Figure 13:
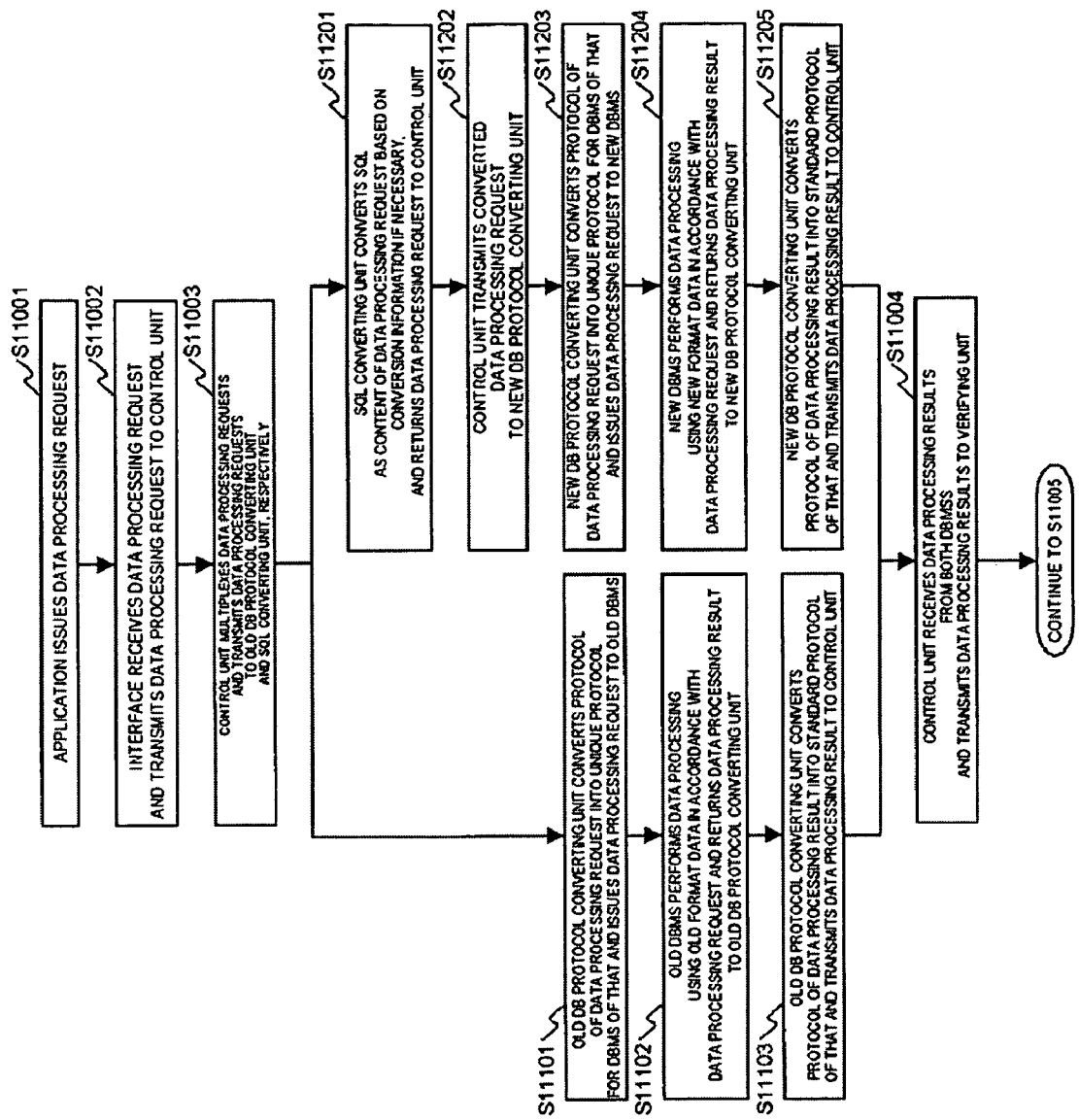
FIG. 13 is a flowchart illustrating the operation of a verification mode of the third exemplary embodiment of the present invention.
Figure 14:
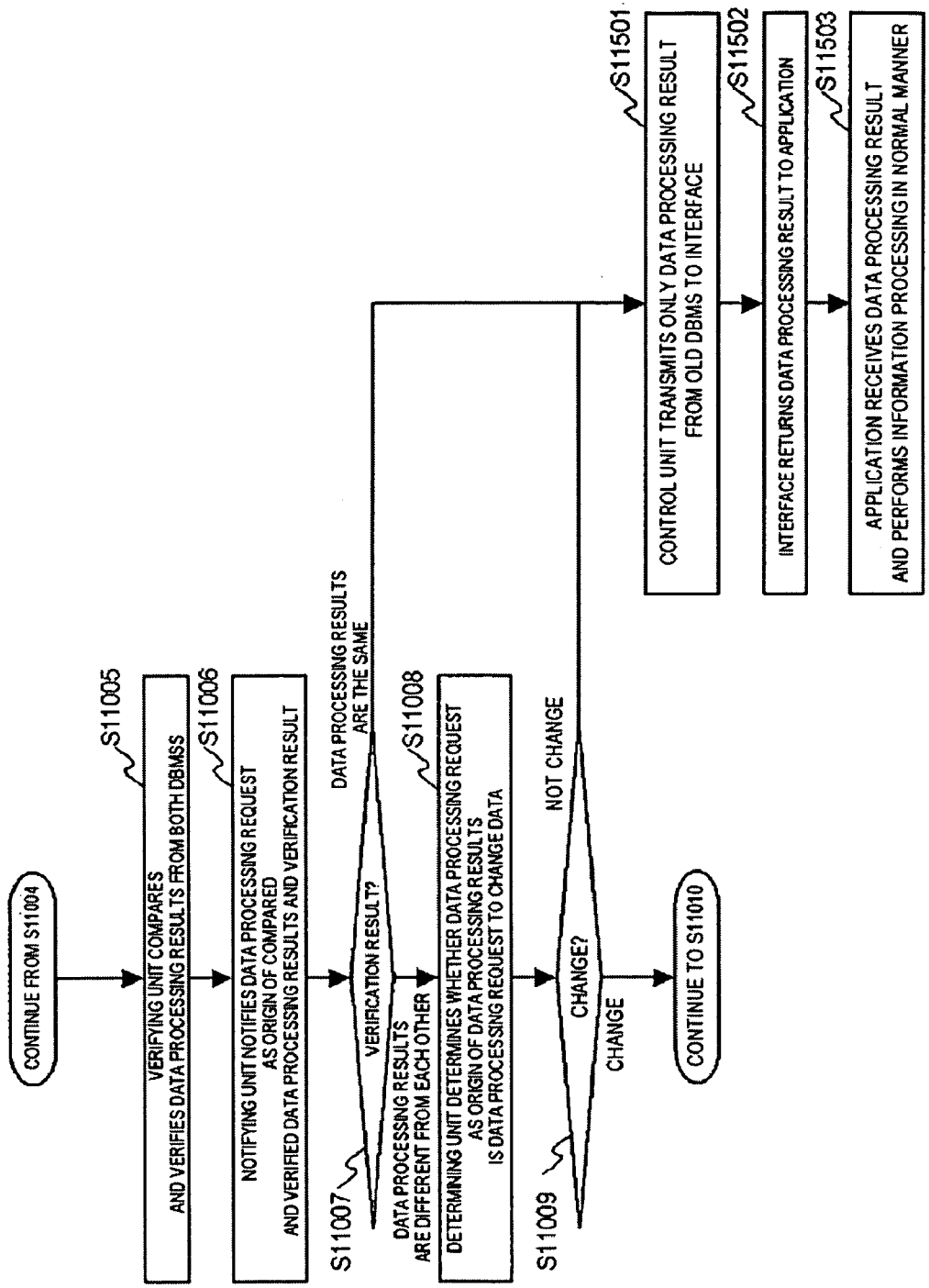
FIG. 14 is a flowchart illustrating the operation of the verification mode of the third exemplary embodiment of the present invention.
Figure 15:
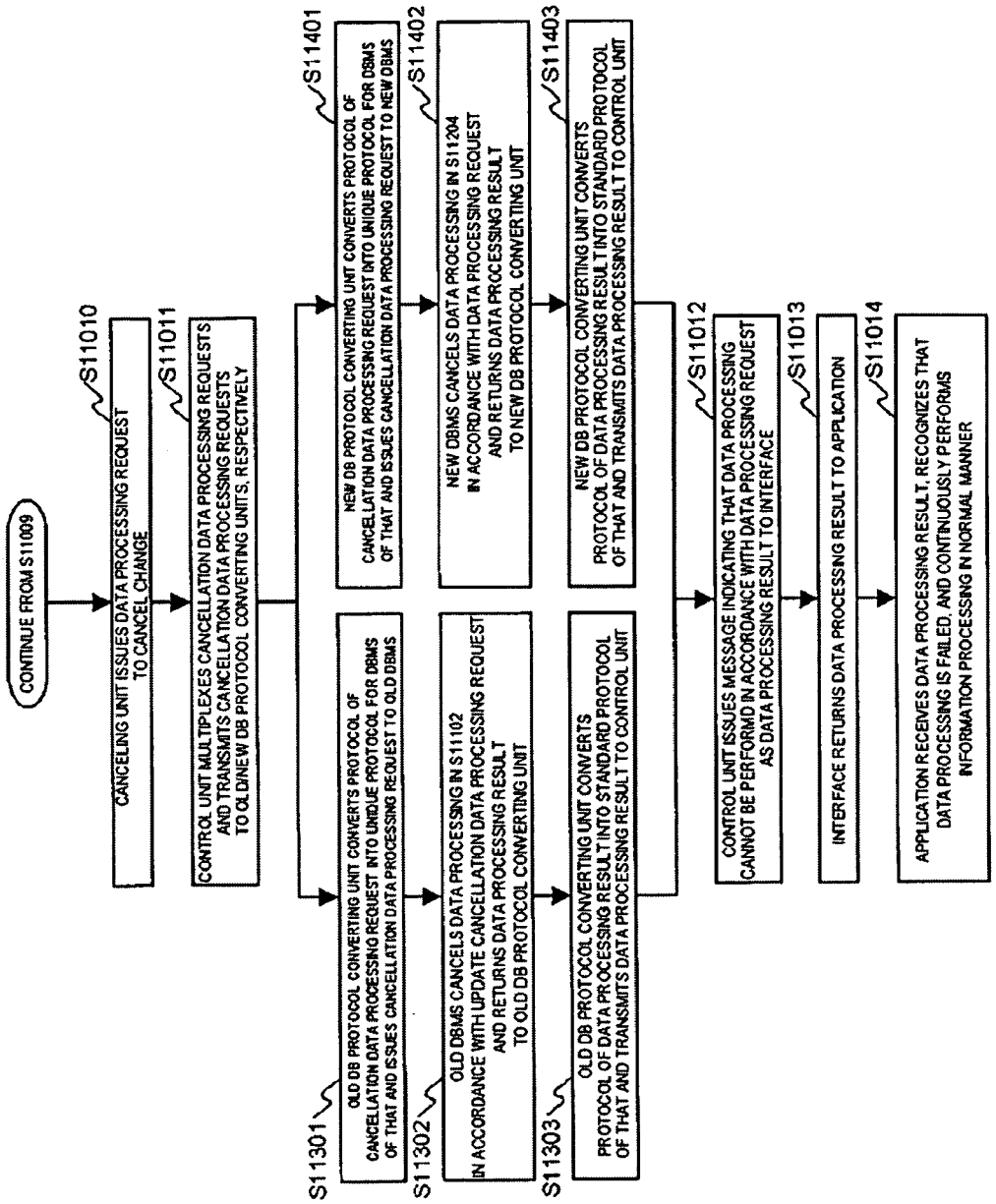
FIG. 15 is a flowchart illustrating the operation of the verification mode of the third exemplary embodiment of the present invention.

The operations shown in Steps S11001, S11002, and S11004, Steps S11101 to S11103, and Steps S11203 to S11205 of FIG. 13, Steps S11005 to S11009 and Steps S11501 to S11503 of FIG. 14, and Steps S11010 to S11014, Steps S11301 to S11303, and Steps S11401 to S11403 of FIG. 15 are the same as the operations shown in Steps S10001, S10002, and S10004, Steps S10101 to S10103, and Step S10201 to S10203 of FIG. 10, Steps S10005 to S10009 and Steps S10501 to S10503 of FIG. 11, and Steps S10010 and S10014, Steps S10301 to S10303, and Steps S10401 to S10403 of FIG. 12, respectively. Accordingly, the description will not be repeated.

The control unit 9122 that has received the data processing request of the standard protocol from the interface 9121 multiplexes the data processing requests and transmits the data processing requests to the old DB protocol converting unit 9123 and the SQL converting unit 9124, respectively (Step S11003).

The SQL converting unit 9124 that has received one of the multiplexed data processing requests investigates the SQL as the content of the data processing request, performs an SQL conversion based on the conversion information 9125 if necessary, and returns the converted data processing request to the control unit 9122 (Step S11201). The control unit 9122 transmits the converted data processing request to the new DB protocol converting unit 9126 (Step S11202).

By this operation, even if the data processing results of the old DBMS 9210 and the new DBMS 9310 are different from each other, logical consistency of the old format data 9220 and the new format data 9320 is maintained by canceling the data processes, and verification of the SQL conversion is continued using both the DBMSs ongoingly.

[Migration Mode]

Since the operation of the migration mode is the same as the operation of the migration mode according to the second exemplary embodiment, the operational description will not be repeated.

[Description of an Effect]

Next, an effect of this exemplary embodiment will be described.

According to this exemplary embodiment, in addition to the effect that is obtained in the second exemplary embodiment, even when the conversion rule is incomplete and the data processing results of the new DBMS and the old DBMS are different from each other, consistency of the old format data and the new format data is maintained by canceling the data processes, and specification of the SQL to be converted and verification of the SQL conversion can be continued.

(Fourth Exemplary Embodiment)

Next, a fourth exemplary embodiment of the present invention will be described in detail with reference to the accompanying drawings.

[Description of the Configuration]

Figure 16:
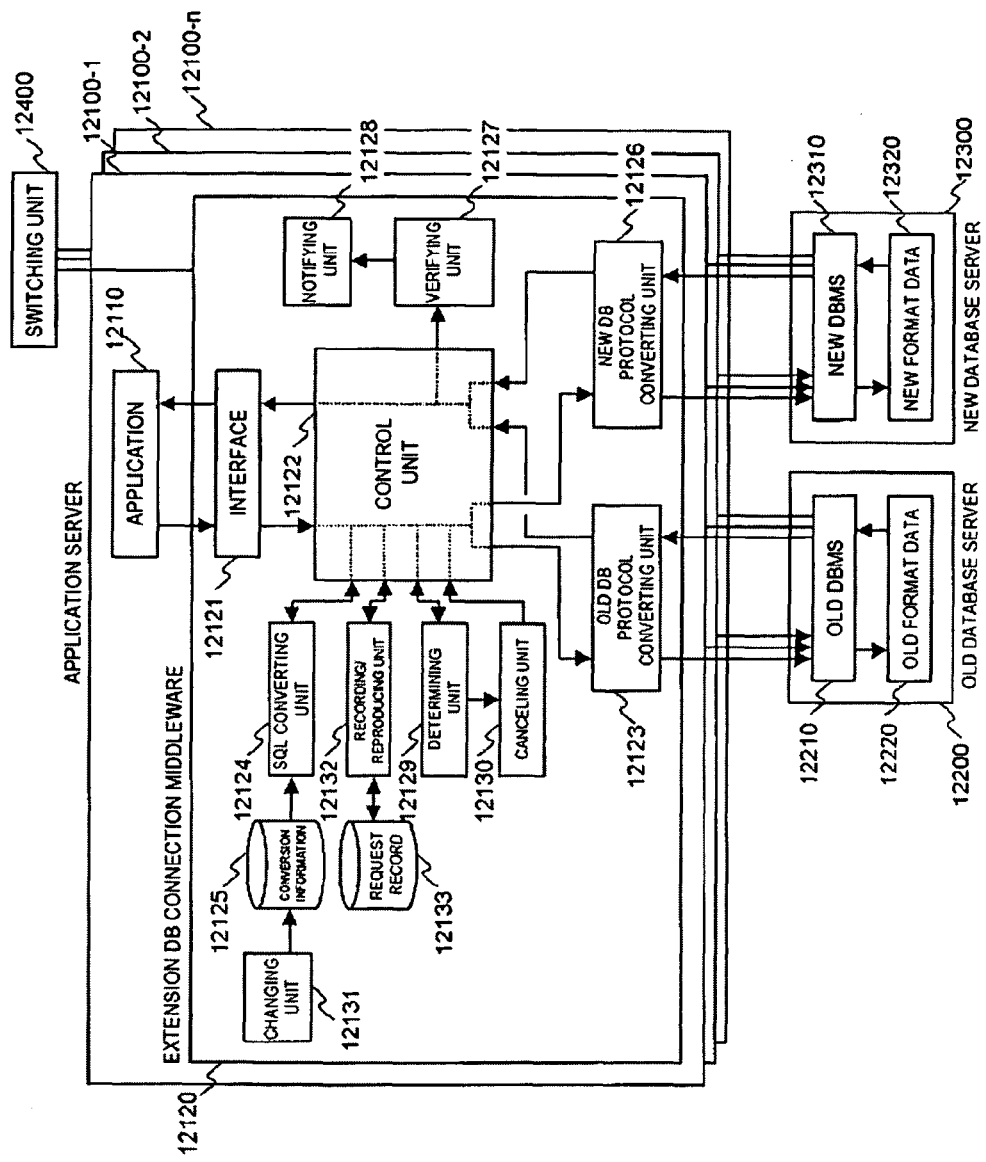
FIG. 16 is a block diagram illustrating the configuration of a fourth exemplary embodiment of the present invention.

FIG. 16 is a block diagram illustrating the configuration of a computer system according to an exemplary embodiment of the present invention.

The computer system according to the exemplary embodiment of the present invention includes one or more application servers 12100-1, 12100-2, and 12100-n on which an application program 12110 that issues a database processing request conforming to a first database operation language (SQL for an old DB) in accordance with a database independent protocol (standard protocol) runs, an old database server 12200 that receives a database processing request conforming to the first database operation language (SQL for the old DB) in accordance with a database dependent protocol (old DB protocol), a now database server 12300 that receives a database processing request conforming to a second database operation language (SQL for a new DB) in accordance with a database dependent protocol (new DB protocol), and a database connecting unit (extension DB connection middleware 12120) that multiplexes the database processing requests issued from the application program 12110, converts one database processing request from its protocol into the database dependant protocol (old DB protocol) suitable for the old database server 12200 to provide the database processing request to the old database server 12200, converts the other database processing request from its database operation language into the second database operation language (SQL for the new DB) and then converts the database processing request from its protocol into the database dependant protocol (new DB protocol) suitable for the new database server 12300 to provide the database processing request to the new database server 12300, converts the data processing results of the old database server 12200 and the new database server 12300 from their protocol into database independent protocol (standard protocol) and compares and verifies the data processing results to output the comparison and verification result, and returns the data processing result of the old database server 12200 converted from its protocol into the database independent protocol (standard protocol) to the application program 12110 when a first mode (verification mode) is designated, and converts the database processing request issued from the application program 12110 from its database operation language into the second database operation language (SQL for the new DB) and then converts the database processing request from its protocol into the database dependant protocol (new DB protocol) suitable for the new database server 12300 to provide the database processing request to the new database server 12300, and converts the data processing result of the new database server 12300 from its protocol into the database independent protocol (standard protocol) to return the data processing result to the application program 12110 when a second mode (migration mode) is designated.

Further, during the processing of the first mode (verification mode), when the data processing results of the old database server 12200 and the new database server 12300 are not matched with each other, the data base connecting unit (extension DB connection middleware 12120) cancels the database processing request to the new database server 12300 as necessary, changes the conversion information 12125 used to convert the first database operation language (SQL for the old DB) into the second database operation language (SQL for the new DB), converts the original database processing request from its database operation language into the second database operation language (SQL for the new DB) using the conversion information 12125 after the change and then converts the database processing request from its protocol into the database dependent protocol (now DB protocol) suitable for the new database server 12300 to provide the database processing request to the new database server 12300, converts the obtained data processing result of the new database server 12300 from its protocol into the database independent protocol (standard protocol), and compares and verifies the data processing result and the data processing result of the old database server 12200.

Referring to FIG. 16, the computer system according to the fourth exemplary embodiment of the present invention includes a plurality of application servers 12100-1, 12100-2, ..., and 12100-n, an old database server 12200, a new database server 12300, and a switching unit 12400 that controls the extension DB connection middleware 12120 of each of the plurality of application servers 12100-1, 12100-2, ..., and 12100-n.

Each of the application servers 12100-1, 12100-2, ..., and 12100-n includes the application 12110 that performs information processing and the extension DB connection middleware 12120 that connects the application 12110 to the old DBMS 12210 and the new DBMS 12310.

The database connecting unit (extension DB connection middleware 12120) includes a specification converting unit (SQL converting unit 12124) that converts the database processing request issued from the application program 12110 from its database operation language (SQL for the old DB) into the second database operation language (SQL for the new DB), a new protocol converting unit (new DB protocol converting unit 12126) that converts the database processing request from its protocol (standard protocol) into the database dependent protocol (new DB protocol) suitable for the new database server 12300 and converts the data processing result of the new database server 12300 from its protocol (new DB protocol) into the database independent protocol (standard protocol) an old protocol converting unit (old DB protocol converting unit 12123) that converts the database processing request from its protocol (standard protocol) into the database dependant protocol (old DB protocol) suitable for the old database server 12200 and converts the data processing result of the old database server 12200 from its protocol (old DB protocol) into the database independent protocol (standard protocol), a verifying unit 12127 that compares and verifies the data processing results of the new database server 12300 and the old database server 12200 converted from its protocol into the database independent protocol (standard protocol), an output unit (notifying unit 12128) that outputs the comparison and verification result of the verifying unit 12127, and a control unit (control unit 12122) that controls processing according to the designated mode among the first mode (verification mode) and the second mode (migration mode).

Specifically, the extension DB connection middleware 12120 includes an interface 12121 that is an interface of a standard protocol, a control unit 12122 that controls a flow of data processing request, an old DB protocol converting unit 12123 that converts the standard protocol into a unique protocol for the old DBMS 12210, a new DB protocol converting unit 12126 that converts the standard protocol into a unique protocol for the new DBMS 12310, an SQL converting unit 12124 that converts an SQL as a content of data processing request, a conversion information storage unit 12125 (hereinafter, referred to as a "conversion information 12125") that stores conversion information as a conversion rule, which defines how to perform an SQL conversion, a changing unit 12131 that changes the conversion information, a verifying unit 12127 that compares and verifies the data processing results, a notifying unit 12128 that notifies the verification result, a determining unit 12129 that identifies and determines the data processing request, a canceling unit 12130 that cancels (rolls back) data processing, a recording and reproducing unit 12132 that records and reproduces the data processing request, and a request recording unit 12133 (hereinafter, referred to as a "request record 12133") that records the request record as the recorded data processing request.

The old database server 12200 includes a storage that accumulates old format data 12220 as data necessary when the application 12110 performs the processing and an old DBMS 12210 before a migration that manages the old format data 12220.

The new database server 12300 includes a storage that accumulates new format data 12320 in which the old format data 12220 is converted into data of a format that can be handled by the new DBMS 12310, and a migrated new DBMS 12310 that manages the new format data 12320.

[Description of the Operation]

Next, referring to the flowcharts shown in FIGS. 16 and 17 to 19, the operation of the computer system according to this exemplary embodiment will be described in detail.

A database access method according to the exemplary embodiment of the present invention is a database access method in the computer system that includes one or more application servers 12100-1, 12100-2, and 12100-n on which the application program 12110 that issues the database processing request conforming to the first database operation language (SQL for the old DB) in accordance with the database independent protocol (standard protocol) runs, the old database server 12200 that receives a database processing request conforming to the first database operation language (SQL for the old DB) in accordance with a database dependent protocol (old DB protocol), and the new database server 12300 that receives a database processing request conforming to the second database operation language (SQL for the new DB) in accordance with a database dependant protocol (new DB protocol). The database connecting unit (extension DB connection middleware 12120) multiplexes the database processing requests issued from the application program 12110 (Step S13004), converts one database processing request from its protocol into the database dependent protocol (old DB protocol) suitable for the old database server 12200 to provide the database processing request to the old database server 12200 (Step S13101), converts the other database processing request from its protocol into the second database operation language (SQL for the new DB) (Step S13201) and then converts the database processing request from its protocol into the database dependant protocol (new DB protocol) suitable for the new database server 12300 to provide the database processing request to the new database server 12300 (Step S13203), converts the data processing results of the old database server 12200 and the new database server 12300 from their protocol into database independent protocol (standard protocol) and compares and verifies the data processing results (Steps S13103, S13205, S13005, and S13006) to output the comparison and verification result (Step S13007), and returns the data processing result of the old database server 12200 converted from its protocol into the database independent protocol (standard protocol) to the application program 12110 (Steps S13501 and S13502) when the first mode (verification mode) is designated, and converts the database processing request issued from the application program 12110 from its database operation language into the second database operation language (SQL for the new DB) (Step S8004 of FIG. 8) and then converts the database processing request from its protocol into the database dependent protocol (new DB protocol) suitable for the new database server 12300 to provide the database processing request to the new database server 12300 (Step S8006 of FIG. 8), converts the data processing result of the new database server 12300 from its protocol into the database independent protocol (standard protocol) to return the data processing result to the application program 12110 (Steps S8008 to S8010 of FIG. 8) when the second mode (migration mode) is designated.

According to this exemplary embodiment, the operations according to the following two modes are performed.

1. Verification Mode

A mode in which, as DBMS migration work, it is verified whether an SQL conversion is performed based on a set conversion rule.

2. Migration Mode

A mode in which a DBMS is migrated to a completely new DBMS.

Each of the modes is changed by switching the operation of the control unit 12122 by the switching unit 12400. The switching operation may be performed by the determination of a person or may be automatically performed by an external control device that monitors a state of the application or the extension DB connection middleware and performs a determination based on the monitored result. Further, in this exemplary embodiment, the same preparation mode as the preparation mode in the second or third exemplary embodiment may be set.

[Verification Mode]

Next, referring to the flowcharts shown in FIGS. 16 and 17 to 19, the operation of the verification mode according to this exemplary embodiment will be described in detail.

Figure 17:
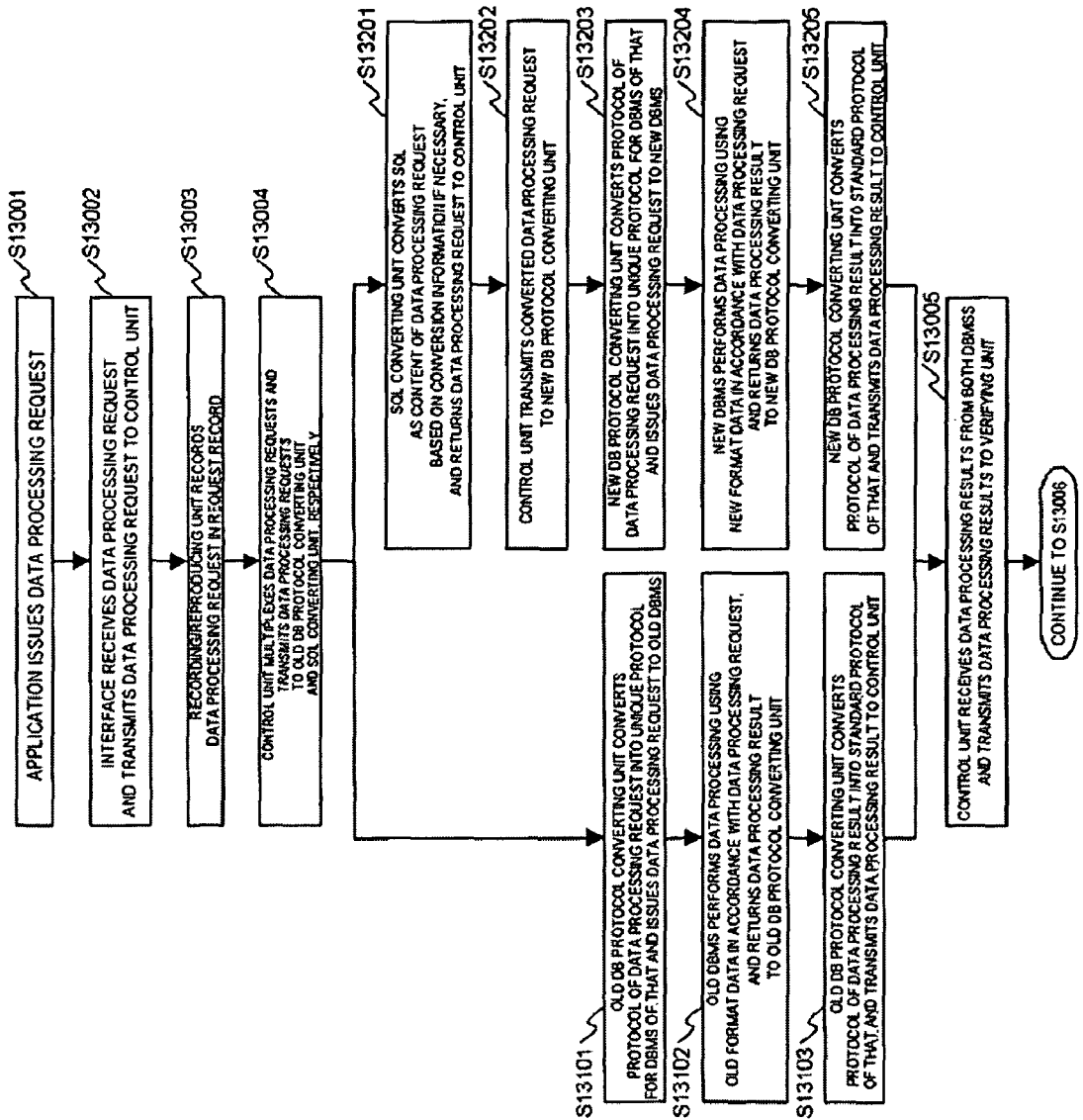
FIG. 17 is a flowchart illustrating the operation of a verification mode of the fourth exemplary embodiment of the present invention.
Figure 18:
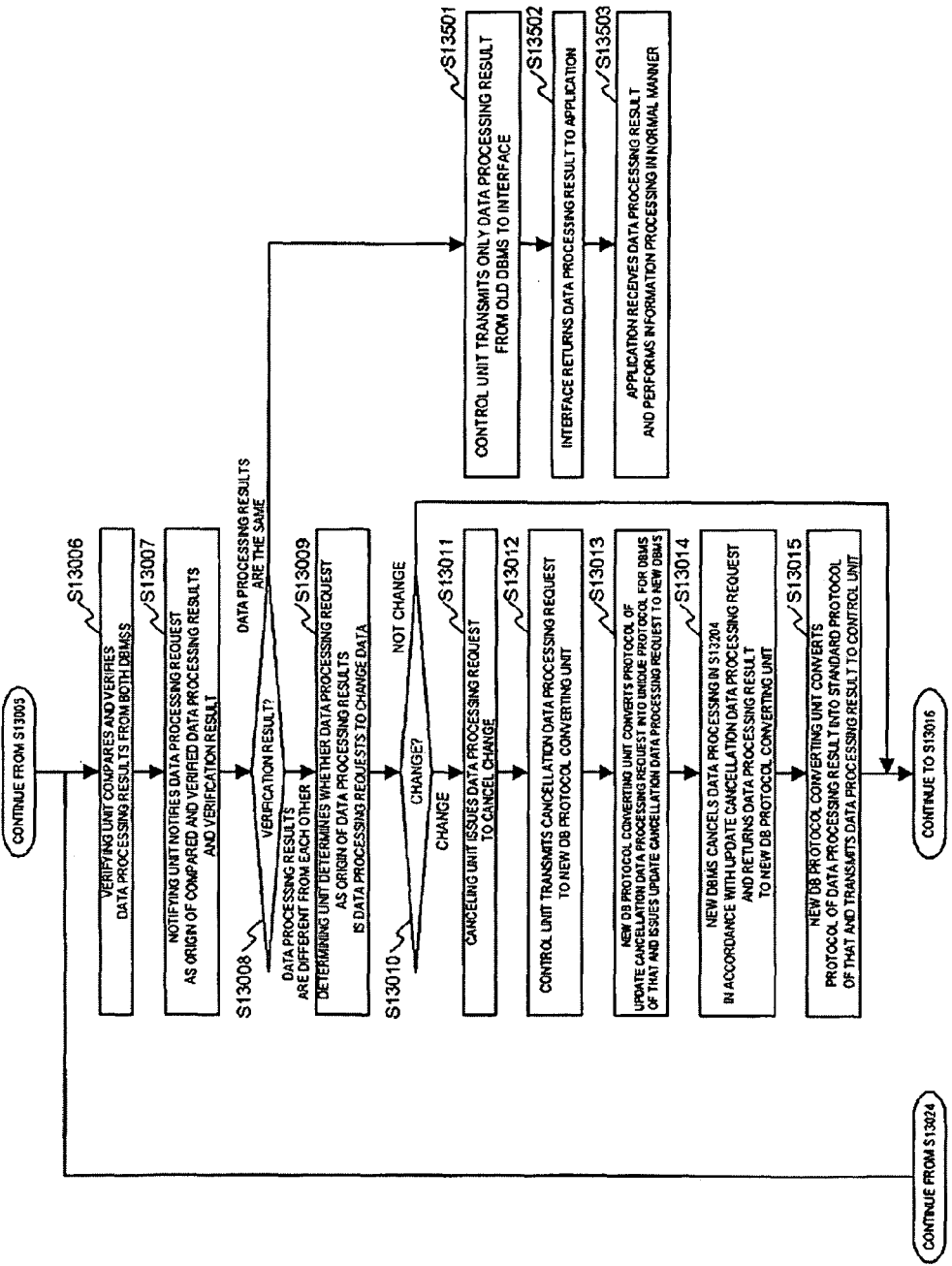
FIG. 18 is a flowchart illustrating the operation of the verification mode of the fourth exemplary embodiment of the present invention.
Figure 19:
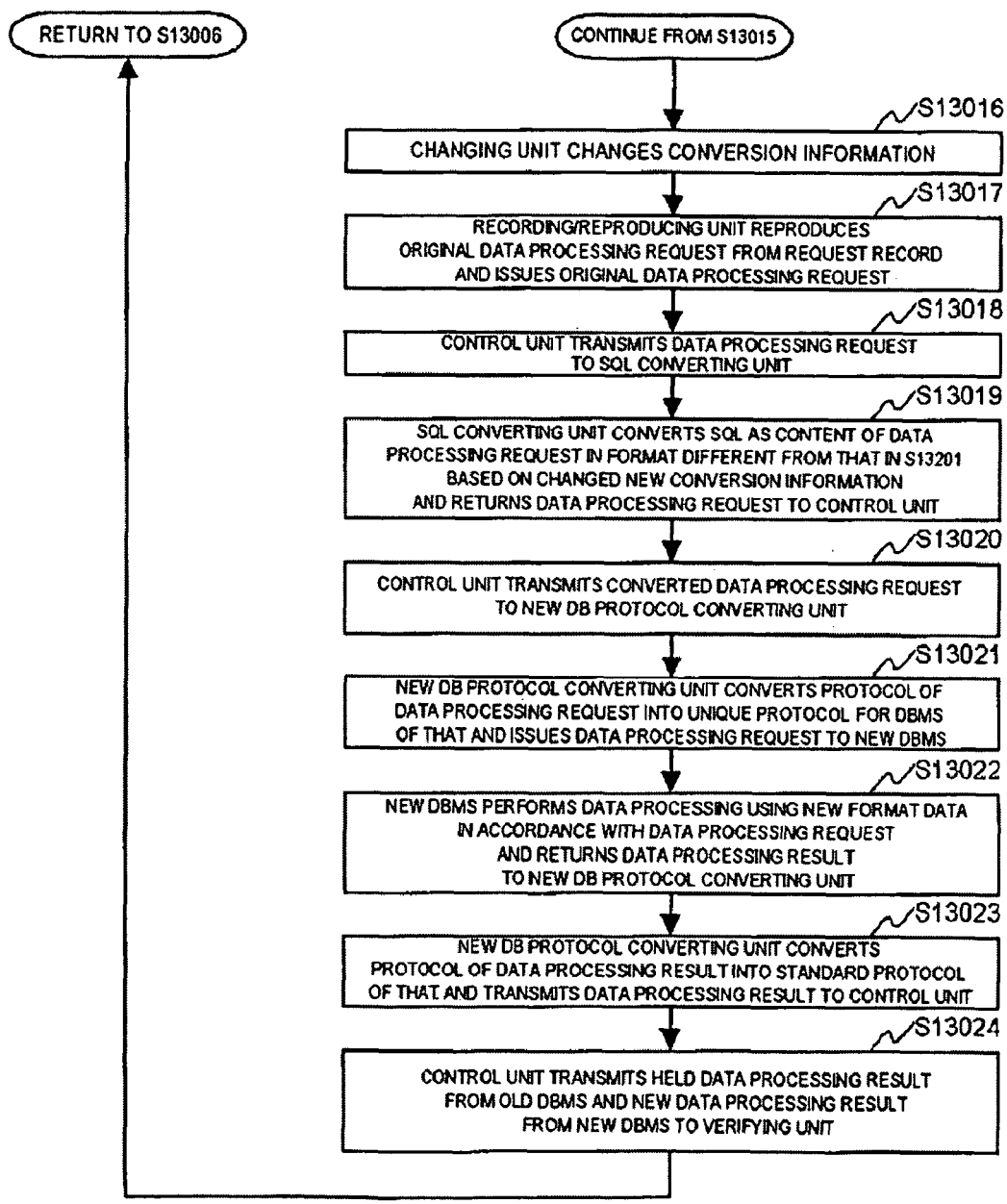
FIG. 19 is a flowchart illustrating the operation of the verification mode of the fourth exemplary embodiment of the present invention.

The operations shown in Steps S13001, S13002, S13004, and S13005, Steps S13101 to S13103, and Steps S13201 to S13205 of FIG. 17 and Steps S13006 to S13010, Step S13011, Steps S13013 to S13015, and Steps S13501 to S13503 of FIG. 18 are the same as the operations shown in Steps S11001, S11002, S11003, and S11004, Steps S11101 to S11103, and Steps S11201 to S11205 of FIG. 13, Steps S11005 to S11009 of FIG. 14, Step S11010 and Steps S11401 to S11403 of FIG. 15, and Steps S11501 to S11503 of FIG. 14, respectively. Accordingly, the description will not be repeated.

The recording and reproducing unit 12132 records the data processing request, which is transmitted from the interface 12121 by the control unit 12122, in the request record 12133 (Step S13003).

The control unit 13122 that has received the cancellation data processing request transmits the cancellation data processing request to the DB protocol converting unit 13126 (Step S13012).

After the data processing performed by the new DBMS 12310 in Step S13204 is cancelled and the control unit 12122 receives the data processing result through the new DB protocol converting unit 12126 (Steps S13013 to S13015), the changing unit 12131 changes the conversion rule of the conversion information 12125 in which the data processing request cannot be converted, such that the new DBMS 12310 returns the same data processing result as the old DBMS 12210 (Step S13016).

The conversion rule may be changed directly by a person, may be changed through an arbitrary system, or may be automatically changed by an external device for a conversion rule change.

The change in the conversion rule means that, for example, an existing conversion rule is replaced, a new conversion rule is added, or an application priority of a plurality of conversion rules is changed.

Further, when a person uses a system to change a conversion rule, a user interface of the system may have a function of supporting work for changing the conversion rule. For example, the user interface shows a succeeded conversion rule or a failed conversion rule using a verification history of the verifying unit 12127 or a verifying unit of another system notified and accumulated by the notifying unit 12128.

Next, the recording and reproducing unit 12132 reproduces the data processing request recorded in Step S13003 from the request record 12133 and issues the data processing request to the control unit 12122 (Step S13017).

The control unit 12122 that has received the reproduced data processing request transmits the data processing request to the SQL converting unit 12124 (Step S13018).

The SQL converting unit 12124 that has received the data processing request performs an SQL conversion different from that in Step S13201 based on the new conversion information 12125 changed in Step S13016, and returns the converted data processing request to the control unit 12122 (Step S13019).

The control unit 12122 that has received the converted data processing request transmits the data processing request to the new DB protocol converting unit 12126 (Step S13020).

The new DB protocol converting unit 12126 that has received the data processing request converts the data processing request from the standard protocol into the unique protocol for the new DBMS 12310 and issues the data processing request to the new DBMS 12310 (Step S13021).

In the new database server 12300, the new DBMS 12310 that has received the data processing request of the unique protocol interprets the SQL of the data processing request, performs data processing using the managed new format data 12320 in accordance with the corresponding request, and returns the data processing result of the unique protocol to the new DB protocol converting unit 12126 (Step S13022).

The new DB protocol converting unit 12126 that has received the data processing result of the unique protocol converts the data processing result from its protocol into the standard protocol and transmits the data processing result to the control unit 12122 (Step S13023).

The control unit 12122 that has received the new data processing result from the new DBMS 12310 transmits the new data processing result and the held data processing result from the old DBMS 12210 to the verifying unit 12127 (Step S13024).

By this operation, when the data processing results of the old DBMS 12210 and the new DBMS 12310 are different from each other, the data processing in the new DBMS 12310 is cancelled, the data processing request is converted according to the changed conversion rule such that the data processing results become the same, and the data processing request is provided to the new DBMS 12310. By repeating the processing, the conversion rule is brushed up, logical consistency of the old format data 12220 and the new format data 12320 is maintained, and the verification is continuously performed using both the DBMSs.

[Migration Mode]

Since the operation in the migration mode is the same as the operation in the migration mode according to the third exemplary embodiment, the operational description will not be repeated.

[Description of an Effect]

Next, an effect of this exemplary embodiment will be described.

According to this exemplary embodiment, in addition to the effect that is obtained in the second exemplary embodiment, even when the conversion rule is incomplete and the data processing results of the new DBMS and the old DBMS are different from each other, consistency of the old format data and the new format data can be maintained and the verification can be continuously performed.

In particular, even if the SQL conversion is not made successfully, the conversion rule is immediately modified based on a history of the verification result of the SQL conversion until now, and the conversion and the provision to the new DBMS are repeated, thereby hiding the fault of the SQL conversion with respect to the application. In a state where the data processing is succeeded, based on the history of the verification result of the SQL conversion until now, the conversion rule is brushed up and the verification is continuously performed.

In the computer system according to this exemplary embodiment, in order to support migration work from the old database server to the new database server, the database processing request that is issued from the application program is multiplexed, one database processing request is provided to the old database server and the other database processing request is converted according to the conversion rule and provided to the new database server, and a mode in which both the data processing results are compared with each other is set, thereby verifying whether conversion information as a rule to which the old database operation language is subjected to the new database operation language is correctly set. At this time, when both the data processing results are not matched with each other, a scheme in which the corresponding conversion rule is changed and retried is provided.

According to the computer system according to this exemplary embodiment, in addition to the effect according to the above-described exemplary embodiment, it is possible to easily set a conversion rule used to convert the database operation language.

The reason is as follows. Even if the database operation language is not successfully converted, the data processing by the conversion is cancelled, the conversion rule is modified based on a history of a verification result of the conversion until now, and the conversion and the provision to the new DBMS using the conversion rule are repeated, thereby hiding the fault of the conversion of the database operation language with respect to the application and brushing up the conversion rule and performing the verification.

(Modification of a Fourth Exemplary Embodiment)

In this modification, the switching unit 12400 detects that the probability of the data processing results of the old DBMS 12210 and the new DBMS 12310 being not matched with each other is lowered during the processing of the first mode (verification mode), and automatically switches the first mode into the second mode (migration mode). In this case, an exemplary embodiment of the switching unit 12400 is shown in FIG. 20.

Figure 20:
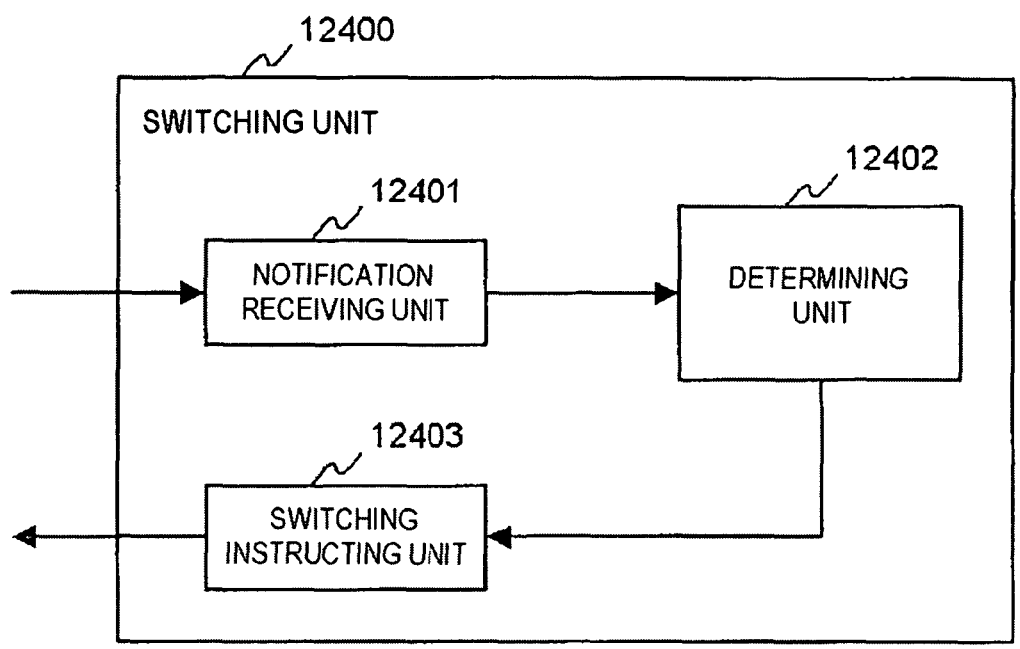
FIG. 20 is a block diagram illustrating an exemplary embodiment of a switching unit.

Referring to FIG. 20, the switching unit 12400 includes a notification receiving unit 12401, a determining unit 12402, and a switching instructing unit 12403.

The notification receiving unit 12401 receives the verification result in the verification mode from the notifying unit 12128 of the extension DB connection middleware 12120 of the application server.

The determining unit 12402 receives the verification result from the notification receiving unit 12401, and detects whether the probability of the data processing results of the old DBMS 12210 and the new DBMS 12310 being not matched with each other is lowered. The detection can be made by determining whether the verification result indicating that the data processing results of the old DBMS 12210 and the new DBMS 12310 are not matched with each other has not been notified for a predetermined period or longer. As another method, the detection can be made by investigating whether the verification is succeeded to all SQLs exemplified in a list of a portion or all of the SQLs to be converted, that is, whether the data processing results of the new and old DBMSs are matched with each other.

When detecting that the probability of the data processing results of the old DBMS 12210 and the new DBMS 12310 being not matched with each other is lowered, the determining unit 12402 notifies the switching instructing unit 12403 of the detection. The switching instructing unit 12403 instructs the control unit 12122 of the extension DB connection middleware 12120 of the application server to switch the current mode into the migration mode.

As described above, in the fourth exemplary embodiment, since it is possible to appropriately brush up the conversion rule in the verification mode, the conversion rule is immediately improved, and a verification fault is rarely generated. In this modification, if the verification fault is not generated over a predetermined period or longer, it is assumed that the conversion rule is completed, and the current mode can be automatically shifted to the migration mode.

(Other Exemplary Embodiments)

The exemplary embodiments of the present invention have been described. However, the present invention is not limited to the above-described exemplary embodiments, and various additions and changes can be made.

Figure 21:
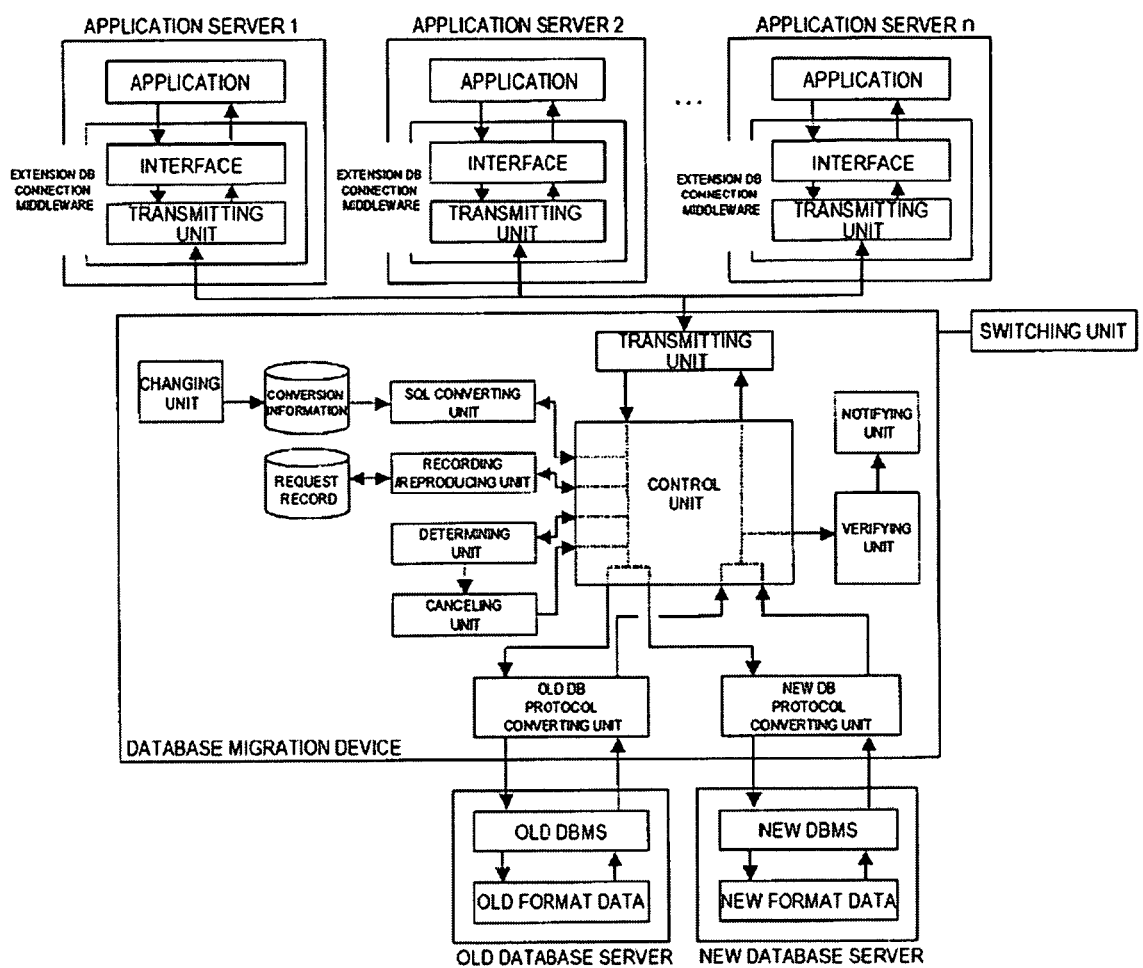
FIG. 21 is a block diagram illustrating the configuration of another exemplary embodiment of the present invention.
Figure 22:
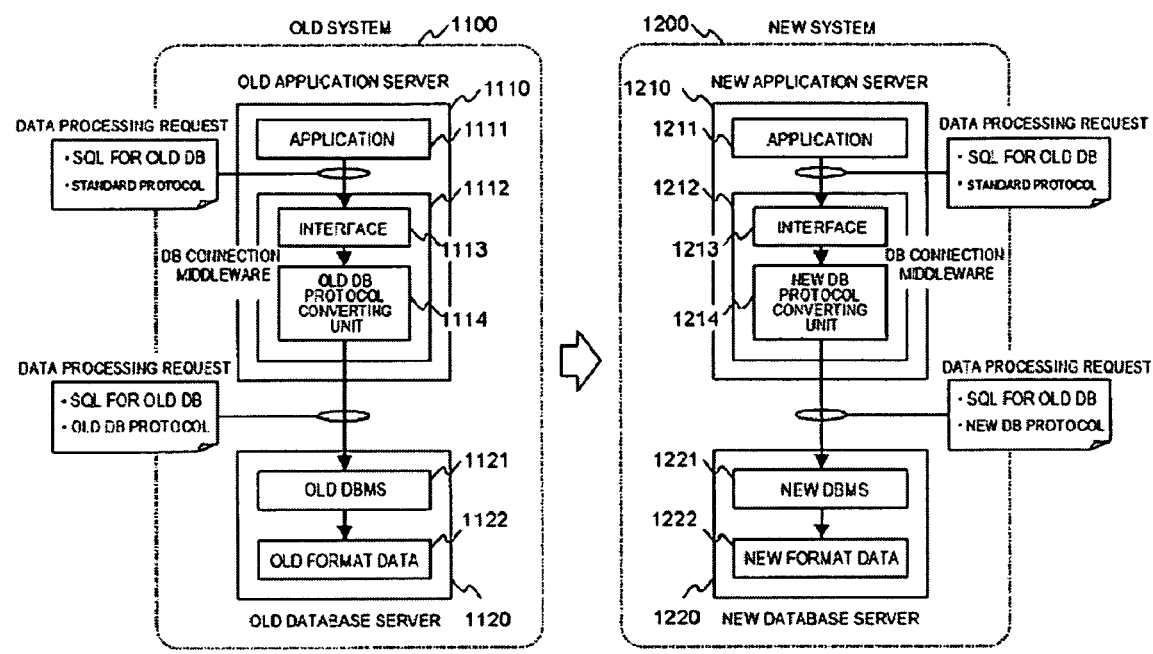
FIG. 22 is a block diagram illustrating the configuration of a computer system on which an application that performs information processing together with a DBMS runs.
Figure 23:
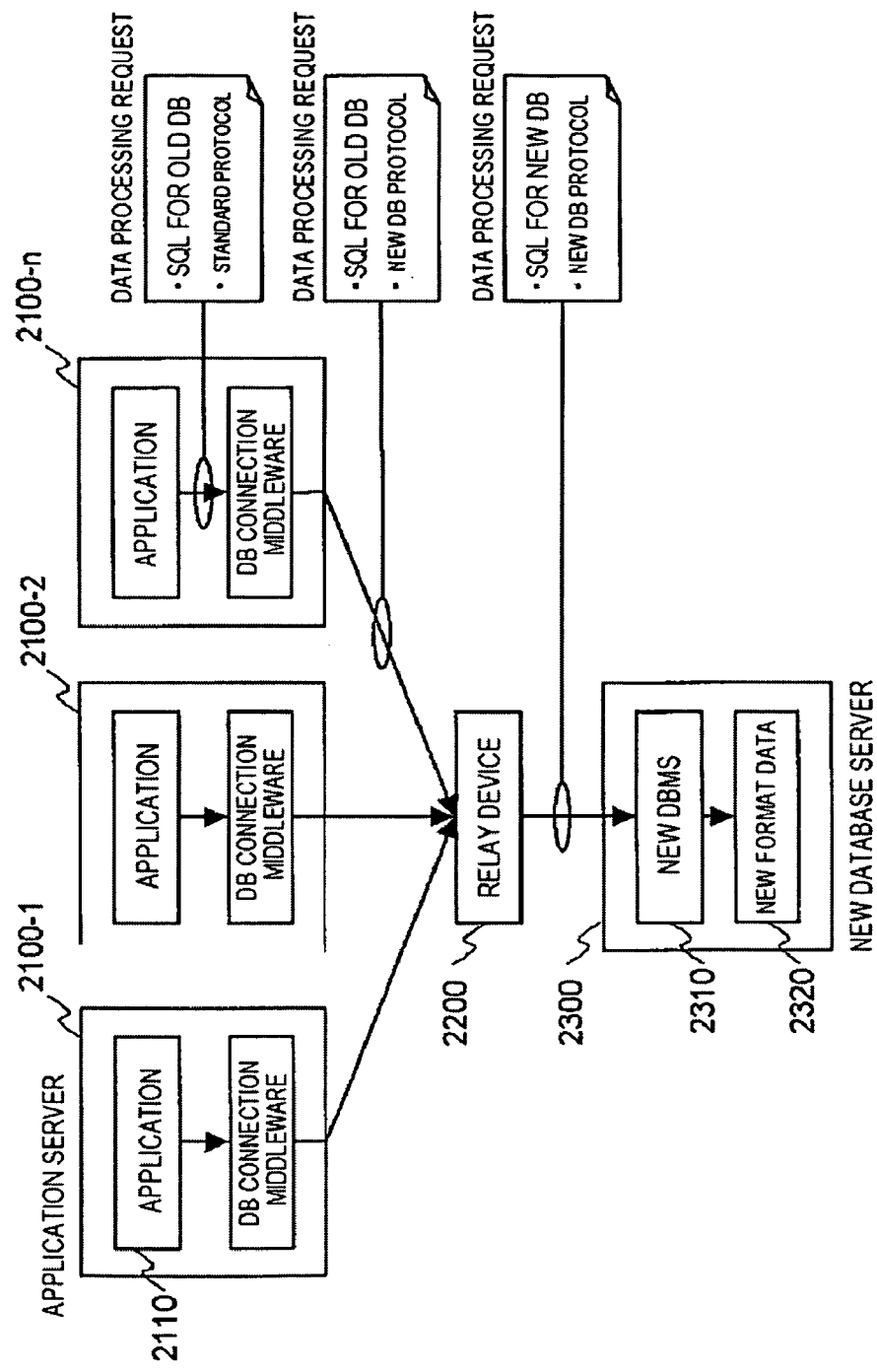
FIG. 23 is a block diagram illustrating the configuration of an SQL conversion system.

For example, in the exemplary embodiments of the present invention, a database migration mechanism including the control unit is disposed for each application server. However, as shown in FIG. 21, the database migration functions may be integrated in the database migration device, and only a transmitting function to the database migration device may be provided in each application server.

As such, if the database migration functions of the plurality of application servers are integrated in the database migration device, maintenance performance is improved. Further, if the database migration function is implemented to be independent of the application server, the weight of the application server can be reduced. However, since the database migration device becomes a bottleneck, that is, a single fault point, performance and fault tolerance are lowered.

Further, the plurality of database migration devices may be prepared. During a general operation, the specific database migration device may be used. When a fault is generated in the specific database migration device, another database migration device may take over the processing.

Further, the exemplary embodiments of the present invention may be combined to be operated.

For example, after specifying the SQL to be converted in the preparation mode according to the third exemplary embodiment, the conversion rule corresponding to the SQL may be set, and the verification in the verification mode according to the fourth exemplary embodiment and brushing up of the conversion rule may be made.

Alternatively, in the fourth exemplary embodiment, when the data processing results are different from each other, the conversion rule is continuously changed until the data processing results become the same. However, when the data processing results are not the same even after the conversion rule is changed a predetermined number of times, the data processes of both the DBMSs may be cancelled, as in the third exemplary embodiment.

Further, the database connecting unit of the present invention can realize its function by a hardware mechanism or a computer and a program. The program is recorded in a computer readable recording medium, such as a magnetic disk or a semiconductor memory, and provided. Then, when the computer starts, the program is read by the computer and controls the operation of the computer, thereby allowing the computer to function as the extension DB connection middleware that is the database connecting unit in the above-described exemplary embodiments.

INDUSTRIAL APPLICABILITY

The present invention can be applied for use of migrating the DBMS to another DBMS with a low cost, in the system that provides a service using the DBMS.

The present invention has been described with reference to the exemplary embodiments and the modifications, but the present invention is not limited to the exemplary embodiments and the modifications. It can be understood by those skilled in the art that various changes can be made in the configuration or the details of the present invention, without departing from the scope of the present invention.

The invention claimed is:

1. A computer system comprising:
   one or more application servers on which an application program that issues a database processing request conforming to a first database operation language in accordance with a database independent protocol runs;
   an old database server which receives the database processing request conforming to the first database operation language in accordance with a database dependant protocol;
   a new database server which receives a database processing request conforming to a second database operation language in accordance with the database dependant protocol; and
   a database connecting unit which converts the database processing request, which conforms to the first database operation language and is issued from said application program, from its protocol into the database dependant protocol suitable for said old database server to provide the converted database processing request to said old database server, and converts said database processing request, which is not converted from the first database operation language into the second database operation language, from its protocol into the database dependant protocol suitable for said new database server to provide the database processing request to said new database server, converts data processing results of said old database server and said new database server from their protocol into the database independent protocol and compares and verifies the data processing results to output the comparison and verification result, and returns the data processing result of said old database server converted from its protocol into the database independent protocol to said application program when a preparation mode is designated, and converts the database processing request issued from said application program from the first database operation language into the second database operation language in accordance with a conversion rule which is set based on the comparison and verification result, and then converts the database processing request from its protocol into the database dependant protocol suitable for said new database server to provide the database processing request to said new database server, and converts the data processing result of said new database server from its protocol into the database independent protocol to return the data processing result to said application program when a migration mode in which said old database server is completely migrated to said new database server is designated.

2. The computer system as set forth in claim 1, wherein said database connecting unit which converts the database processing request, which conforms to the first database operation language and is issued from said application program, from its protocol into the database dependant protocol suitable for said old database server to provide the database processing request for said old database server, as well as converts said database processing request from the first database operation language into the second database operation language in accordance with a predetermined conversion rule which is set, and then converts the database processing request from its protocol into the database dependant protocol suitable for said new database server to provide the database processing request for said new database server, converts the data processing results of said old database server and said new database server from their protocol into the database independent protocol and compares and verifies the data processing results to output the comparison and verification result, and returns the data processing result of said old database server converted from its protocol into the database independent protocol to said application program when a verification mode is designated, and converts the database processing request issued from said application program from the first database operation language into the second database operation language in accordance with the conversion rule which is set again based on said comparison and verification result, and then converts the database processing request from its protocol into the database dependant protocol suitable for said new database server to provide the database processing request to said new database server, and converts the data processing result of said new database server from its protocol into said database independent protocol to return the data processing result to said application program when a migration mode that migrates from said old database server to said new database server completely is designated.

3. The computer system as set forth in claim 2, wherein, during processing of said preparation mode, when the data processing results of said old database server and said new database server are not matched with each other, said database connecting unit cancels the database processing request to said new database server as necessary, changes said conversion information used to convert said first database operation language into said second database operation language and converts said original database processing request from its database operation language into said second database operation language using said conversion information after said change, converts the database processing request from its protocol into said database dependent protocol suitable for said new database server to provide the database processing request to said new database server, and converts said obtained data processing result of said new database server from its protocol into said database independent protocol to compare and verify the data processing result and the data processing result of said old database server.

4. The computer system as set forth in claim 3, further comprising a switching unit which switches said verification mode into said migration mode by detecting when the probability of the data processing results of said old database server and said new database server being not matched with each other is lowered, during said processing of said verification mode.

5. The computer system as set forth in claim 2, wherein in said verification mode, said database connecting unit specifies the operation language and the conversion rule which are to be set again based on said comparison and verification results, and repeats setting and verifying.

6. The computer system as set forth in claim 2, wherein in said verification mode, said database connecting unit returns only said data processing result of said old database sever to said application program when said data processing results of said new database server are an error.

7. The computer system as set forth in claim 1, wherein, during processing of said preparation mode, when the data processing results of said old database server and said new database server are not matched with each other, said database connecting unit stops further provision of database processing request to said new database server.

8. The computer system as set forth in claim 1, wherein, during processing of said preparation mode, when the data processing results of said old database server and said new database server are not matched with each other, if said original database processing request is a request to change data, said database connecting unit stops further provision of the database processing request to said new database server.

9. The computer system as set forth in claim 1, wherein, during processing of said preparation mode, when the data processing results of said old database server and said new database server are not matched with each other, if said original database processing request is a request to change data, said database connecting unit cancels the database processing request to said old database server and said new database server, and returns the data processing result indicating that said database processes are not performed to said application program.

10. The computer system as set forth in claim 1, wherein said database connecting unit includes:
a specification converting unit which converts the database processing request issued from said application program from its database operation language into said second database operation language;
a new protocol converting unit which converts the database processing request from its protocol into the database dependant protocol suitable for said new database server and converts the data processing result of said new database server from its protocol into the database independent protocol;
an old protocol converting unit which converts the database processing request from its protocol into the database dependant protocol suitable for said old database server and converts the data processing result of said old database server from its protocol into the database independent protocol;

a verifying unit which compares and verifies the data processing results of said new database server and said old database server converted from their protocol into said database independent protocol;

an output unit which outputs the comparison and verification result of said verifying unit; and a control unit which controls processing according to said designated mode among said preparation mode and said migration mode.

11. The computer system as set forth in claim 10, wherein said output unit outputs said comparison and verification result while changing a notification destination or a notification condition in accordance with a situation.

12. The computer system as set forth in claim 1, wherein said comparison and verification result in said database connecting unit includes a result which is attained by judging whether said data processing results respectively obtained from said old database server and said new database server are the same or different.

13. The computer system as set forth in claim 1, wherein said database connecting unit measures data processing times necessary until the data processing results are returned after the data processing requests are provided, compares said data processing times to determine the database operation language that needs long processing time as a database operation language in which it is better to perform a conversion for performance tuning, and outputs the determination as said comparison and verification result.

14. The computer system as set forth in claim 1, wherein in said preparation mode, said database connecting unit returns only said data processing result of said old database server to said application program when said data processing results of said new database server are an error.

15. A database access method in a computer system that includes one or more application servers on which an application program that issues a database processing request conforming to a first database operation language in accordance with a database independent protocol runs, an old database server which receives the database processing request based on said first database operation language in accordance with a database dependant protocol, and a new database server which receives a database processing request conforming to a second database operation language in accordance with said database dependant protocol, wherein a database connecting unit, when a preparation mode is designated, performs:

converting the database processing request, which conforms to the first database operation language and is issued from said application program, from its protocol into the database dependant protocol suitable for said old database server to provide the converted database processing request to said old database server, and converting said database processing request, which is not converted from the first database operation language into the second database operation language, from its protocol into the database dependant protocol suitable for said new database server to provide the database processing request to said new database server, converting the data processing results of said old database server and said new database server from its protocol into the database independent protocol and comparing and verifying the data processing results, outputting the comparison and verification result, and returning the data processing result of said old database server converted from its protocol into the database independent protocol to said application program, and when a migration mode in which said old database server is completely migrated to said new database server is designated, said database connecting unit further performs:

converting the database processing request issued from said application program from the first database operation language into the second database operation language in accordance with a conversion rule which is set based on the comparison and verification result, and converting the database processing request from its protocol into the database dependant protocol suitable for said new database server to provide the database processing request to said new database server, and converting the data processing result of said new database server from its protocol into the database independent protocol to return the data processing result to said application program.

16. The database access method as set forth in claim 15, wherein said database connecting unit, when a verification mode is designated, performs:

converting the database processing request, which conforms to the first database operation language and is issued from said application program from its protocol into the database dependant protocol suitable for said old database server to provide the database processing request for said old database server, converting said database processing request from the first database operation language into the second database operation language in accordance with a predetermined conversion rule which is set, and then converts the database processing request from its protocol into the database dependant protocol suitable for said new database server to provide the database processing request for said new database server, converting the data processing results of said old database server and said new database server from their protocol into the database independent protocol and comparing and verifying the data processing results, outputting the comparison and verification result, and returning the data processing result of said old database server converted from its protocol into said database independent protocol to said application program, and when a migration mode is designated that migrates from said old database server to said new database server completely, said database connecting unit further performs:

converting the database processing request issued from said application program from the first database operation language into the second database operation language in accordance with the conversion rule which is set again based on said comparison and verification result, and converting the database processing request from its protocol into the database dependant protocol suitable for said new database server to provide the database processing request to said new database server, and converting the data processing result of said new database server from its protocol into the database independent protocol to return the data processing result to said application program.

17. An application server on which an application program that issues a database processing request conforming to a first database operation language in accordance with a database independent protocol runs, comprising a database connecting unit which converts the database processing request, which conforms to the first database operation language and is issued from said application program, from its protocol into said database dependant protocol suitable for an old database server that receives the database processing request based on said first database operation language in accordance with said database dependent protocol to provide the database processing request to said old database server, and converts said database processing request, which is not converted from the first database operation language into the second database operation language, from its protocol into the database dependant protocol suitable for a new database server that receives a database processing request conforming to a second database operation language in accordance with said database dependent protocol to provide the database processing request to said new database server, converts the data processing results of said old database server and said new database server from their protocol into the database independent protocol and compares and verifies the data processing results to output the comparison and verification result, and returns the data processing result of said old database server converted from its protocol into the database independent protocol to said application program when a preparation mode is designated, and converts the database processing request issued from said application program from the first database operation language into said second database operation language in accordance with a conversion rule which is set based on the comparison and verification result, and then converts the database processing request from its protocol into said database dependant protocol suitable for said new database server to provide the database processing request to said new database server, and converts the data processing result of said new database server from its protocol into said database independent protocol to return the data processing result to said application program when migration mode in which said old database server is completely migrated to said new database server is designated.

18. The application server as set forth in claim 17, wherein said database connecting unit which converts the database processing request, which conforms to the first database operation language and is issued from said application program from its protocol into said database dependant protocol suitable for an old database server that receives the database processing request based on said first database operation language in accordance with said database dependent protocol to provide the database processing request for said old database server, as well as converts said database processing request from the first database operation language into a second database operation language in accordance with a predetermined conversion rule which is set, and then converts the database processing request from its protocol into said database dependant protocol suitable for a new database server that receives a database processing request based on said second database operation language in accordance with said database dependent protocol to provide the database processing request for said new database server, converts the data processing results of said old database server and said new database server from their protocol into the database independent protocol and compares and verifies said data processing results to output the comparison and verification result, and returns the data processing result of said old database server converted from its protocol into said database independent protocol to said application program when a verification mode is designated, and converts the database processing request issued from said application program from the first database operation language into the second database operation language in accordance with the conversion rule which is set again based on said comparison and verification result, and then converts the database processing request from its protocol into the database dependant protocol suitable for said new database server to provide the database processing request to said new database server, and converts the data processing result of said new database server from its protocol into the database independent protocol to return the data processing result to said application program when a migration mode that migrates from said old database server to said new database server completely is designated.

19. A non-transitory computer-readable data storage medium storing a program that allows a computer to perform, in relation to database processing requests conforming to a first database operation language issued from an application program in accordance with a database independent protocol, a method comprising:

when a preparation mode is designated,
a first process of converting the database processing request, which conforms to the first database operation language and is issued from said application program, from its protocol into a database dependent protocol suitable for an old database server that receives the database processing request based on said first database operation language in accordance with said database dependent protocol to provide the converted database processing request to said old database server;
a second process of converting said database processing request, which is not converted from the first database operation language into the second database operation language, from its protocol into a database dependent protocol suitable for a new database server that receives a database processing request conforming to a second database operation language in accordance with said database dependent protocol to provide the database processing request to said new database server;
a third process of converting the data processing results of said old database server and said new database server from their protocol into the database independent protocol and comparing and verifying the data processing results to output the comparison and verification result; and
a fourth process of returning the data processing result of said old database server converted from its protocol into said database independent protocol to said application program,
when a migration mode in which said old database server is completely migrated to said new database server is designated,
a fifth process of converting the database processing request issued from said application program from the first database operation language into the second database operation language in accordance with a conversion rule which is set based on the comparison and verification result, and converting the database processing request from its protocol into said database dependant protocol suitable for said new database server to provide the database processing request to said new database server; and
a sixth process of converting the data processing result of said new database server from its protocol into the database independent protocol to return the data processing result to said application program.

20. The non-transitory computer-readable data storage medium as set forth in claim 19, wherein the method further comprises:

when a verification mode is designated,
a seventh process of converting the database processing request, which conforms to the first database operation language and is issued from said application program, from its protocol into a database dependent protocol suitable for an old database server that receives the database processing request based on said first database operation language in accordance with said database dependent protocol to provide the database processing request for said old database server;
a eighth process of converting said database processing request from the first database operation language into a second database operation language in accordance with a predetermined conversion rule which is set, and then converting the database processing request from its protocol into the database dependent protocol suitable for said new database server to provide the database processing request for said new database server;
a ninth process of converting the data processing results of said old database server and said new database server from their protocol into the database independent protocol and comparing and verifying the data processing results to output the comparison and verification result; and
a tenth process of returning the data processing result of said old database server converted from its protocol into said database independent protocol to said application program,
when a migration mode is designated that migrates from said old database server to said new database server completely,
a eleventh process of converting the database processing request issued from said application program from the database operation language into the second database operation language in accordance with the conversion rule which is set again based on said comparison and verification result, and then converting the database processing request from its protocol into the database dependant protocol suitable for said new database server to provide the database processing request to said new database server; and
a twelfth process of converting the data processing result of said new database server from its protocol into the database independent protocol to return the data processing result to said application program.

21. The non-transitory computer-readable data storage medium as set forth in claim 20, wherein, as the comparison and verification result in said third process, when the data processing results of said old database server and said new database server are not matched with each other, said program allows said computer to perform process of canceling the database processing request to said new database server as necessary, changing conversion information used to convert said first database operation language into said second database operation language, then converting said original database processing request from its database operation language into the second database operation language using said conversion information after said change and converting the database processing request from its protocol into the database dependent protocol suitable for said new database server to provide the database processing request to said new database server, and converting the obtained data processing result of said new database server from its protocol into the database independent protocol to compare and verify the data processing result and the data processing result of said old database server.

22. The non-transitory computer-readable data storage medium as set forth in claim 19, wherein, as the comparison and verification result in said third process, when the data processing results of said old database server and said new database server are not matched with each other, said program allows said computer to perform process of stopping further provision of database processing request to said new database server.

23. The non-transitory computer-readable data storage medium as set forth in claim 19, wherein, as the comparison and verification result in said third process, when the data processing results of said old database server and said new database server are not matched with each other, if said original database processing requests are requests to change data, said program allows said computer to perform process of stopping further provision of database processing request to said new database server.

24. The non-transitory computer-readable data storage medium as set forth in claim 19, wherein, as the comparison and verification result in said third process, when the data processing results of said old database server and said new database server are not matched with each other, if said original database processing requests are requests to change data, said program allows said computer to perform process of canceling the database processing requests to said old database server and said new database server and returning the data processing results indicating that said database processes are cancelled to said application program.

* * * * *